(12) United States Patent
Matsumoto et al.

(10) Patent No.: US 11,422,016 B2
(45) Date of Patent: Aug. 23, 2022

(54) THERMAL FLOW RATE METER

(71) Applicant: Hitachi Automotive Systems, Ltd., Hitachinaka (JP)

(72) Inventors: Masahiro Matsumoto, Tokyo (JP); Hiroshi Nakano, Tokyo (JP); Akira Uenodan, Hitachinaka (JP); Akira Kotabe, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 32 days.

(21) Appl. No.: 17/041,659

(22) PCT Filed: Feb. 15, 2019

(86) PCT No.: PCT/JP2019/005499
§ 371 (c)(1),
(2) Date: Sep. 25, 2020

(87) PCT Pub. No.: WO2019/198335
PCT Pub. Date: Oct. 17, 2019

(65) Prior Publication Data
US 2021/0131847 A1    May 6, 2021

(30) Foreign Application Priority Data
Apr. 11, 2018 (JP) .............................. JP2018-076241

(51) Int. Cl.
*G01F 1/696* (2006.01)
*G01F 1/692* (2006.01)

(52) U.S. Cl.
CPC .............. *G01F 1/696* (2013.01); *G01F 1/692* (2013.01)

(58) Field of Classification Search
CPC ................................. G01F 1/696; G01F 1/692
See application file for complete search history.

(56) References Cited

U.S. PATENT DOCUMENTS 5,681,989 A    10/1997    Kanke
5,705,957 A *   1/1998    Oka .................. H03L 1/026
                                              331/158

(Continued)

FOREIGN PATENT DOCUMENTS

JP    H08-145754 A    6/1996
JP    2002-340645 A   11/2002
JP    2015-049135 A    3/2015

OTHER PUBLICATIONS

International Search Report with English translation and Written Opinion issued in corresponding application No. PCT/JP2019/005499 dated Jun. 4, 2019.

*Primary Examiner* — Francis C Gray
(74) *Attorney, Agent, or Firm* — Foley & Lardner LLP

(57) ABSTRACT

Provided is a thermal flow rate meter capable of individually correcting different pulsation errors generated in an upstream side temperature sensor and a downstream side temperature sensor. A thermal flow rate meter 1 which measures a flow rate of a gas based on a temperature difference between an upstream side temperature sensor 12 and a downstream side temperature sensor 13, which are arranged on the upstream side and the downstream side of a heating element 11. The thermal flow rate meter includes: a detection element 10 that individually outputs an output signal of the upstream side temperature sensor 12 and an output signal of the downstream side temperature sensor 13; and compensator 20 that individually performs response compensation of the output signal of the upstream side temperature sensor 12 and the output signal of the downstream side temperature sensor 13.

20 Claims, 18 Drawing Sheets

(56) References Cited

U.S. PATENT DOCUMENTS

| | | | |
|---|---|---|---|
| 9,319,049 B2 * | 4/2016 | Bagnall | H03L 1/027 |
| 2002/0170352 A1 | 11/2002 | Tanimoto | |
| 2005/0072225 A1 * | 4/2005 | Kanke | G01F 1/6845 |
| 2008/0164952 A1 * | 7/2008 | Babitch | G01S 19/235 |
| | | | 331/66 |
| 2014/0224004 A1 * | 8/2014 | Ariyoshi | G01F 1/72 |
| | | | 73/114.34 |
| 2016/0202200 A1 * | 7/2016 | Nakano | G01N 33/0067 |
| | | | 73/23.31 |
| 2016/0209255 A1 | 7/2016 | Doi | |
| 2021/0247219 A1 * | 8/2021 | Isoya | G01F 15/046 |

* cited by examiner

THERMAL FLOW RATE METER

TECHNICAL FIELD

The present disclosure relates to a thermal flow rate meter.

BACKGROUND ART

Conventionally, there is known an invention relating to a thermal flow sensor that measures an air flow rate based on the amount of heat released to air (see PTL 1 below). The thermal flow sensor described in PTL 1 has an air flow rate detection element and a correction circuit portion (see the same literature, claim 1 and the like). The air flow rate detection element has a diaphragm having a thin-film portion on a semiconductor substrate.

The correction circuit portion has at least one heat generating resistor on a diaphragm of the air flow rate detection element. Further, the correction circuit portion includes at least one temperature measuring resistor that detects temperature on each of an upstream side and a downstream side of the heat generating resistor. The correction circuit portion processes an output signal of the air flow rate detection element based on temperature difference information of at least the two temperature measuring resistors on the upstream side and the downstream side.

This conventional thermal flow sensor is characterized by a waveform of the output signal processed by the correction circuit portion. The waveform of the output signal is a waveform obtained by cutting a part of a mountain part or a valley part constituting a peak value by outputting of an arbitrary predetermined value when the peak value of the waveform exceeds the arbitrary predetermined value. As a result, it is possible to provide the thermal flow sensor with improved measurement accuracy (see the same literature, paragraph 0010 and the like).

CITATION LIST

Patent Literature

PTL 1: JP 2015-049135 A

SUMMARY OF INVENTION

Technical Problem

With the above-described configuration, the conventional thermal flow sensor can reduce a pulsation error of the output signal and improve the measurement accuracy at the time of measuring a flow rate of pulsating intake air. However, there is room for improvement because different pulsation errors occur in the temperature measuring resistor on the upstream side and the temperature measuring resistor on the downstream side.

The present disclosure provides a thermal flow rate meter capable of individually correcting different pulsation errors generated in an upstream side temperature sensor and a downstream side temperature sensor.

Solution to Problem

One aspect of the present disclosure is a thermal flow rate meter which measures a flow rate of a gas based on a temperature difference between an upstream side temperature sensor and a downstream side temperature sensor respectively arranged on an upstream side and a downstream side of a heating element, the thermal flow rate meter including: a detection element that individually takes out output signals of the upstream side temperature sensor and the downstream side temperature sensor; and a compensator that individually performs response compensation of the output signal of the upstream side temperature sensor and the output signal of the downstream side temperature sensor.

Advantageous Effects of Invention

According to one aspect of the present disclosure, it is possible to provide the thermal flow rate meter capable of individually correcting different pulsation errors generated in the upstream side temperature sensor and the downstream side temperature sensor.

DESCRIPTION OF EMBODIMENTS

Hereinafter, embodiments of a thermal flow rate meter of the present invention will be described with reference to the drawings. Note that the respective embodiments can be combined as long as no contradiction occurs.

First Embodiment

Figure 1:
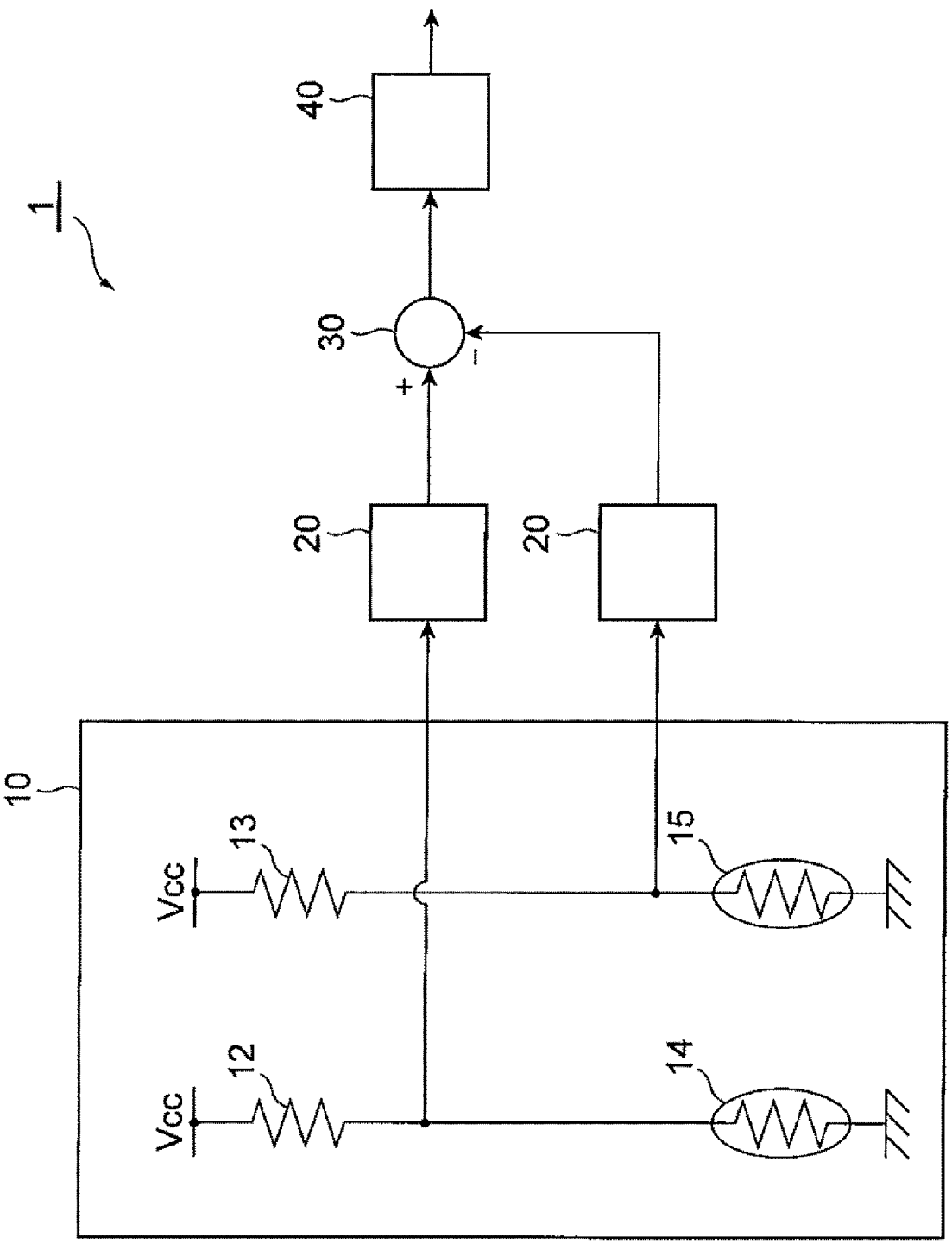
FIG. 1 is a schematic circuit diagram of a thermal flow rate meter according to a first embodiment.
Figure 2:
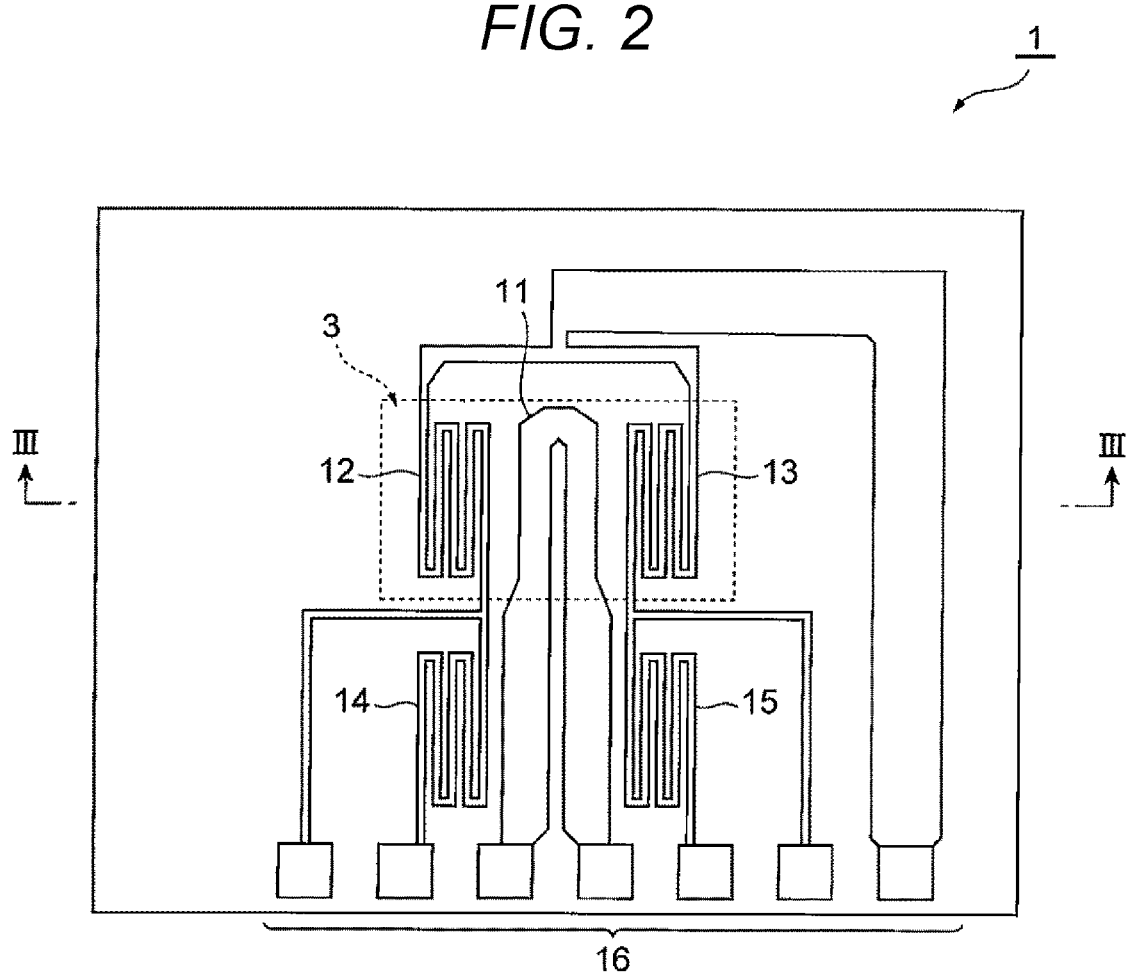
FIG. 2 is a schematic plan view of the thermal flow rate meter according to the first embodiment.
Figure 3:
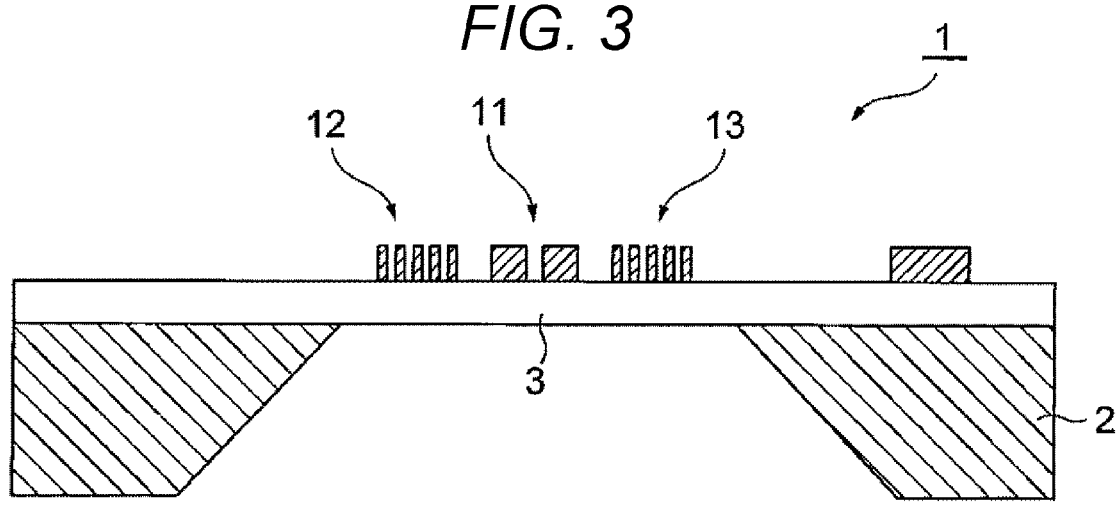
FIG. 3 is a cross-sectional view of the thermal flow rate meter taken along line in FIG. 2.

FIG. 1 is a schematic circuit diagram of a thermal flow rate meter 1 according to a first embodiment. FIG. 2 is a schematic plan view of the thermal flow rate meter according to the first embodiment. FIG. 3 is a cross-sectional view of the thermal flow rate meter 1 taken along line in FIG. 2.

The thermal flow rate meter 1 of the present embodiment is used, for example, as an air flow rate meter that measures a flow rate of air taken into an internal combustion engine such as an automobile engine. The flow rate of air taken into the engine pulsates according to, for example, a rotational speed of a piston. The thermal flow rate meter 1 of the present embodiment has the following characteristic configuration, and thus, can reduce a measurement error of a gas flow rate, that is, a pulsation error as compared with the conventional case, for example, even if pulsation occurs in a flow rate of a gas to be measured such as air.

The thermal flow rate meter 1 of the present embodiment includes, for example, a detection element 10 and a compensator 20. The detection element 10 includes, for example, a heating element 11, an upstream side temperature sensor 12, and a downstream side temperature sensor 13. The thermal flow rate meter 1 measures the gas flow rate based on a temperature difference between the upstream side temperature sensor 12 and the downstream side temperature sensor 13 which are respectively arranged on the upstream side and the downstream side of the heating element 11. The detection element 10 individually outputs an output signal of the upstream side temperature sensor 12 and an output signal of the downstream side temperature sensor 13. The compensator 20 individually performs response compensation on the output signal of the upstream side temperature sensor 12 and the output signal of the downstream side temperature sensor 13. Hereinafter, the configuration of the thermal flow rate meter 1 of the present embodiment will be described in more detail.

As illustrated in FIG. 1, the thermal flow rate meter 1 includes, for example, a subtractor 30 and a pulsation correction circuit 40 in addition to the detection element 10 and the compensator 20 described above. Further, the thermal flow rate meter 1 includes, for example, a substrate 2 and a diaphragm 3 provided on the substrate 2 as illustrated in FIGS. 2 and 3. Further, the detection element 10 includes a first fixed resistor 14, a second fixed resistor 15, and an electrode pad 16 in addition to the heating element 11, the upstream side temperature sensor 12 and the downstream side temperature sensor 13 described above.

The substrate 2 is, for example, a silicon substrate, and the diaphragm 3 is configured using an insulating film on the surface of the substrate 2. More specifically, the diaphragm 3 is, for example, a thin film-shaped portion in which a thermal insulating film provided on a front surface of the substrate 2 is exposed on a back surface side of the substrate 2 due to a recess formed in a central portion of the back surface of the substrate 2 by etching.

The heating element 11 is, for example, a heater that is provided on the insulating film on the surface of the substrate 2 and generates heat when energized, and is heated to a higher temperature than a gas such as air whose flow rate is to be measured. The heating element 11 has, for example, a starting end connected to an electrode pad 16 provided on one side of the substrate 2, and extends toward the diaphragm 3 in the central portion of the substrate 2. The heating element 11 further extends so as to cross the central portion of the diaphragm 3, folded back in a U shape in the opposite direction in the vicinity of an edge of the diaphragm 3 to extend toward the one side of the substrate 2, and has a terminal end connected to the electrode pad 16 provided on the one side of the substrate 2.

The upstream side temperature sensor 12 and the downstream side temperature sensor 13 are arranged on the upstream side and the downstream side of the heating element 11, respectively. The "Upstream side" and "downstream side" in these upstream side temperature sensor 12 and downstream side temperature sensor 13 refer to, for example, the upstream side and the downstream side in the forward flow in which air, which is the gas to be measured by the thermal flow rate meter 1, flows toward the engine. Therefore, the upstream side temperature sensor 12 is located on the downstream side of the air, and the downstream side temperature sensor 13 is located upstream of the air in the backflow of air in which air flows in the opposite direction to the forward flow, for example, due to the pulsation of air caused by a reciprocating motion of the piston of the engine.

The upstream side temperature sensor 12 and the downstream side temperature sensor 13 are, for example, temperature sensitive resistors or thermocouples, and are provided on the diaphragm 3. More specifically, the upstream side temperature sensor 12 and the downstream side temperature sensor 13 are provided, for example, on an insulating film on the surface of the substrate 2 and are arranged in a region of the substrate 2 where the diaphragm is formed. The temperature sensitive resistor is configured using, for example, a polysilicon thin film or a platinum thin film, and the thermocouple is configured using, for example, a polysilicon thin film or a metal thin film.

The upstream side temperature sensor 12 and the downstream side temperature sensor 13 are connected to a power supply voltage Vcc via, for example, a wiring and the electrode pad 16 formed on the insulating film on the surface of the substrate 2. The upstream side temperature sensor 12 and the downstream side temperature sensor 13 are arranged on both sides of the heating element 11 in a flow direction of the gas to be measured, measure the temperature of the gas on the upstream side and the downstream side of the heating element 11, and output the output signals according to the temperature of the gas.

The detection element 10 is configured to be capable of individually taking out the output signal of the upstream side temperature sensor 12 and the output signal of the downstream side temperature sensor 13. More specifically, a wiring for extraction of the output signal according to the temperature of the gas measured by the upstream side temperature sensor 12 is connected between the upstream side temperature sensor 12 and the first fixed resistor 14, and the output signal of the upstream side temperature sensor 12 is input to the first compensator 20 via this wiring and the electrode pad 16. Further, a wiring for extraction of the output signal according to the temperature of the gas measured by the downstream side temperature sensor 13 is connected between the downstream side temperature sensor 13 and the second fixed resistor 15, and the output signal of the downstream side temperature sensor 13 is input to the second compensator 20 via this wiring and the electrode pad 16.

The first fixed resistor 14 is connected in series to the upstream side temperature sensor 12, and is connected to a ground potential via the electrode pad 16, for example. The second fixed resistor 15 is connected in series to the downstream side temperature sensor 13, and is connected to the ground potential via the electrode pad 16, for example. A shape of the upstream side temperature sensor 12 is, for example, the same as a shape of the first fixed resistor 14. Further, a shape of the downstream side temperature sensor 13 is the same as a shape of the second fixed resistor 15, for example. Furthermore, the shape of the first fixed resistor 14 is the same as the shape of the second fixed resistor 15, for example. That is, the shape of the upstream side temperature sensor 12 is the same as the shape of the downstream side temperature sensor 13, for example.

More specifically, the upstream side temperature sensor 12, the downstream side temperature sensor 13, the first fixed resistor 14, and the second fixed resistor 15 have a rectangular wave shape having a wavelength in the flow direction of the gas to be measured and an amplitude in a direction orthogonal to the flow direction of the gas to be measured. Note that the expression that the shapes of any two of the upstream side temperature sensor 12, the downstream side temperature sensor 13, the first fixed resistor 14, and the second fixed resistor 15 are the same includes a case where two shapes and dimensions are the same and a case where two have line symmetrical shapes.

The first fixed resistor 14 and the second fixed resistor 15 are provided on the substrate 2 outside the diaphragm 3, for example. More specifically, the first fixed resistor 14 and the second fixed resistor 15 are provided, for example, on the insulating film on the surface of the substrate 2 and are arranged outside a region of the substrate 2 where the diaphragm 3 is formed. Further, the first fixed resistor 14 and the second fixed resistor 15 are arranged, for example, close to each other. More specifically, the first fixed resistor 14 and the second fixed resistor 15 are arranged close to each other with the heating element 11 interposed therebetween. In other words, the first fixed resistor 14 and the second fixed resistor 15 are adjacent to each other only with the heating element 11 interposed therebetween, and no element other than the heating element 11 is arranged between the first fixed resistor 14 and the second fixed resistor 15.

The compensator 20 is, for example, a response compensation circuit, and individually performs response compensation of the output signal of the upstream side temperature sensor 12 and the output signal of the downstream side temperature sensor 13 individually output from the detection element 10. More specifically, the first compensator 20 is connected between the upstream side temperature sensor 12 and the first fixed resistor 14 via the wiring and the electrode pad 16, for example, and the output of the upstream side temperature sensor 12 is individually input thereto. Further, the second compensator 20 is connected between the downstream side temperature sensor 13 and the second fixed resistor 15 via the wiring and the electrode pad 16, for example, and the output of the downstream side temperature sensor 13 is individually input thereto.

Figure 4:
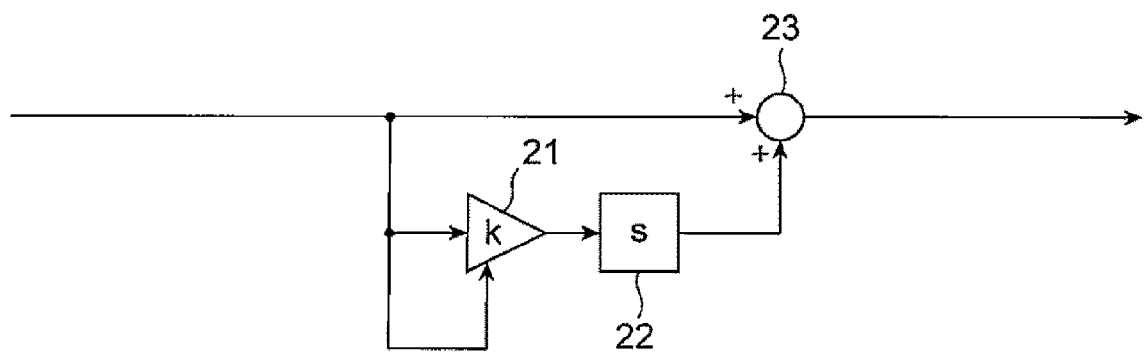
FIG. 4 is a circuit diagram illustrating a configuration of a compensator of the thermal flow rate meter of FIG. 1.

FIG. 4 is a circuit diagram illustrating an example of a configuration of the compensator 20 in the thermal flow rate meter 1 of FIG. 1. The compensator 20 includes, for example, a multiplier 21, a differentiator circuit 22, and an adder 23. The multiplier 21 is configured such that a value of a coefficient k changes depending on a value of a voltage that is the output signal from the upstream side temperature sensor 12 or the downstream side temperature sensor 13, for example. The differentiator circuit 22 is configured to, for example, differentiate the voltage that is the output signal from the upstream side temperature sensor 12 or the downstream side temperature sensor 13. The adder 23 is configured to add, for example, an output of the differentiator circuit 22 and the voltage that is the output signal from the upstream side temperature sensor 12 or the downstream side temperature sensor 13.

Figure 5:
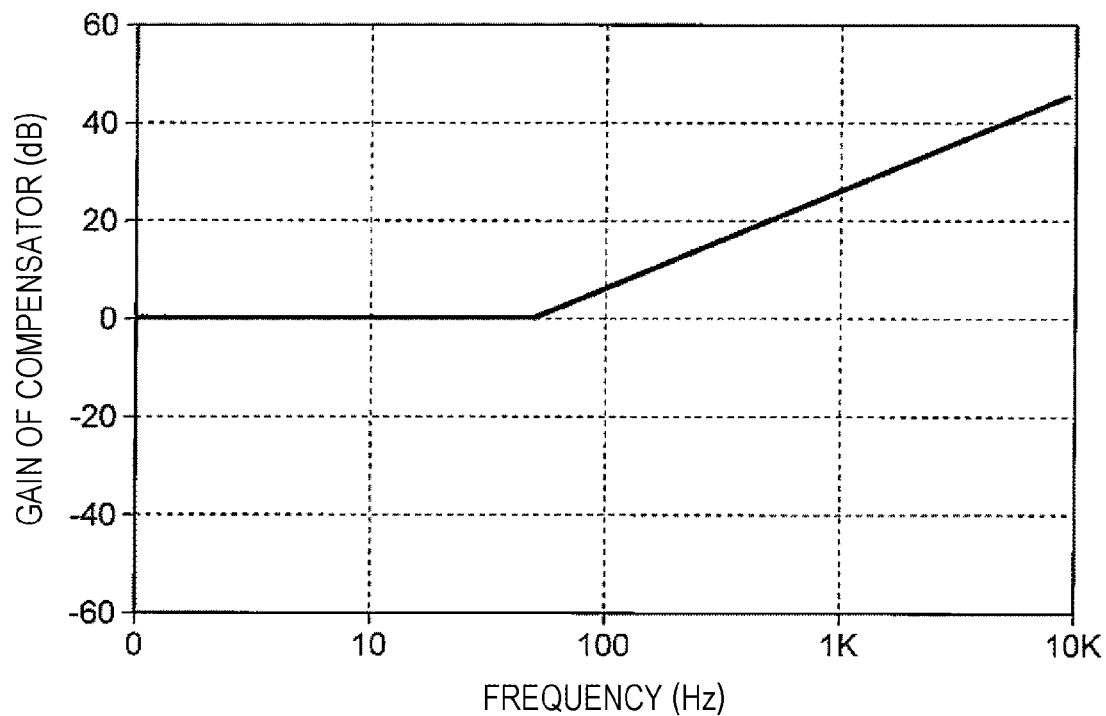
FIG. 5 is a graph illustrating a frequency characteristic of the compensator in FIG. 4.

FIG. 5 is a graph illustrating a frequency characteristic of the compensator 20 of FIG. 4. A cutoff frequency of the compensator 20 changes depending on the value of the coefficient k in the multiplier 21. The compensator 20 changes the value of the coefficient k in the multiplier 21 depending on the value of the voltage, which is the output signal from the upstream side temperature sensor 12 or the downstream side temperature sensor 13, to compensate for a change in responsiveness in the upstream side temperature sensor 12 and the downstream side temperature sensor 13 which will be described later.

The subtractor 30 obtains a difference between an output of the compensator 20 connected between the upstream side temperature sensor 12 and the first fixed resistor 14 and an output of the compensator 20 connected between the downstream side temperature sensor 13 and the second fixed resistor 15. The pulsation correction circuit 40 corrects the pulsation of the gas to be measured based on the difference obtained by the subtractor 30. The thermal flow rate meter 1 outputs a correction result of the pulsation correction circuit 40 as a signal according to the flow rate of air.

Hereinafter, an operation of the thermal flow rate meter 1 of the present embodiment will be described.

Figure 6:
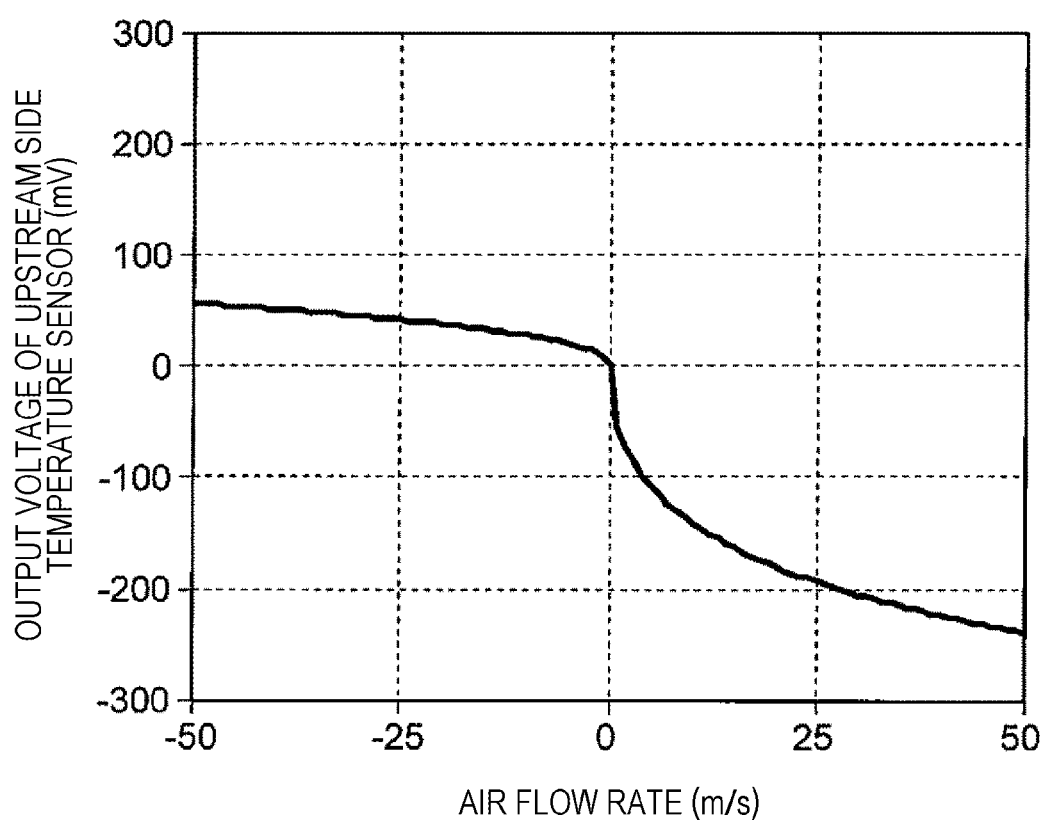
FIG. 6 is a graph illustrating an output characteristic of an upstream side temperature sensor of the thermal flow rate meter of FIG. 1.
Figure 7:
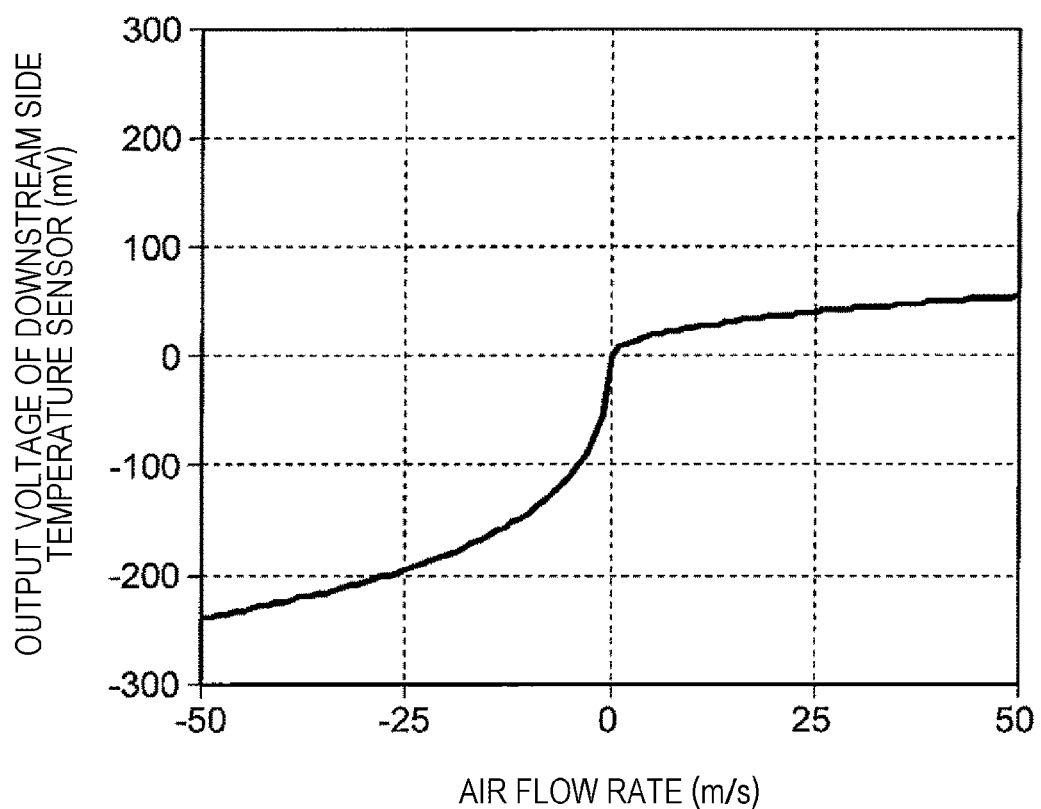
FIG. 7 is a graph illustrating an output characteristic of a downstream side temperature sensor of the thermal flow rate meter of FIG. 1.
Figure 8:
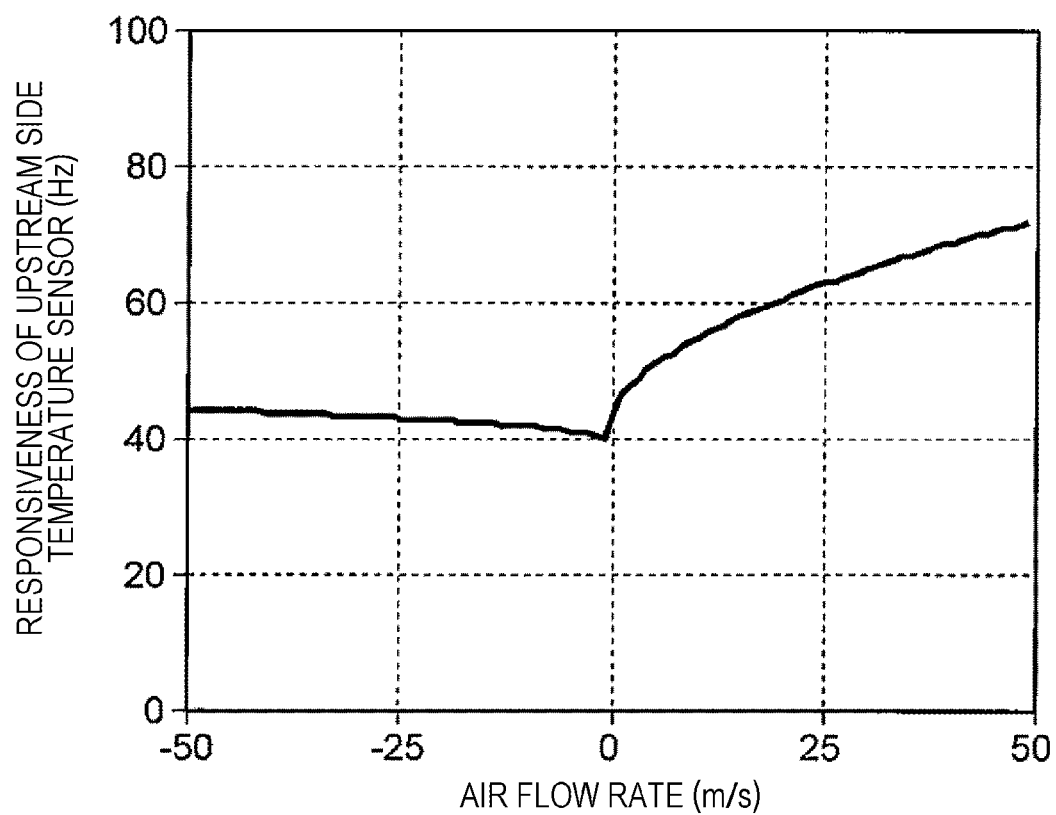
FIG. 8 is a graph illustrating responsiveness of the upstream side temperature sensor of the thermal flow rate meter of FIG. 1.
Figure 9:
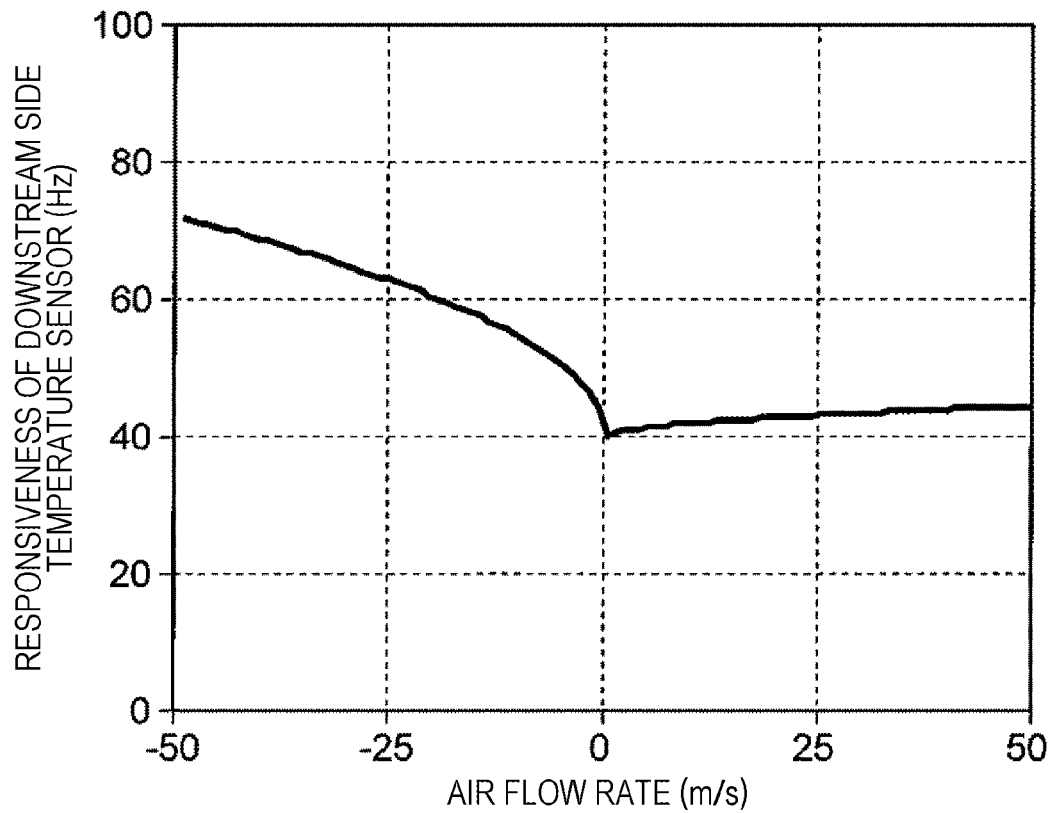
FIG. 9 is a graph illustrating responsiveness of the downstream side temperature sensor of the thermal flow rate meter of FIG. 1.
Figure 10:
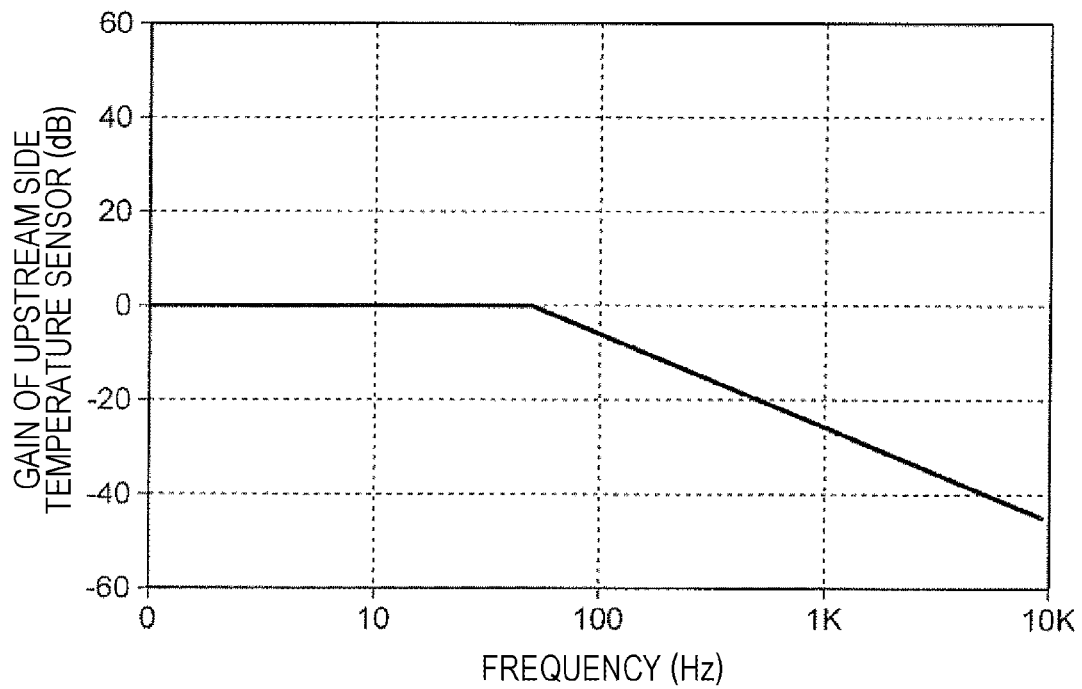
FIG. 10 is a graph illustrating a gain of the upstream side temperature sensor of the thermal flow rate meter of FIG. 1.

FIG. 6 is a graph illustrating an example of an output characteristic of the upstream side temperature sensor 12. FIG. 7 is a graph illustrating an example of an output characteristic of the downstream side temperature sensor 13. FIG. 8 is a graph illustrating an example of responsiveness of the upstream side temperature sensor 12. FIG. 9 is a graph illustrating an example of responsiveness of the downstream side temperature sensor 13. In FIGS. 6 to 9, the horizontal axis represents a flow rate [m/s] of air which is the gas to be measured, a negative value indicates a flow rate of air flowing in the backward direction, and a positive value indicates a flow rate of air flowing in the forward direction. FIG. 10 is a graph illustrating an example of a gain of the upstream side temperature sensor 12.

In order to measure a flow rate of a gas such as air with the thermal flow rate meter 1, the heating element 11 is energized to heat the heating element 11 to a temperature higher than a temperature of the gas to be measured. In this state, during the forward flow in which the gas flows in the forward direction along the insulating film on the surface of the substrate 2, the gas around the heating element 11 heated by the heating element 11 moves to the downstream side, so that the temperature of the gas decreases on the upstream side of the heating element I and the temperature of the gas increases on the downstream side of the heating element 11.

Then, the resistance of the upstream side temperature sensor 12 increases as the temperature of the upstream side temperature sensor 12 arranged on the upstream side of the heating element 11 decreases, and the voltage that is the output signal of the upstream side temperature sensor 12 decreases below 0 [mV] as illustrated in FIG. 6. Since the amount of heat released by the flow of the gas such as air is proportional to the square root of the flow rate, the output characteristic of the upstream side temperature sensor 12 illustrates saturation characteristic as illustrated in FIG. 6. Further, during the forward flow of the gas, the resistance of the upstream side temperature sensor 12 decreases as the temperature of the downstream side temperature sensor 13 arranged on the downstream side of the heating element 11 increases, and the voltage that is the output signal of the downstream side temperature sensor 13 increases above 0 [mV] as illustrated in FIG. 7.

Further, during the backflow in which the gas flows in the opposite direction along the insulating film on the surface of the substrate 2, the gas around the heating element 11 heated by the heating element 11 moves to the upstream side, so that the temperature of the gas increases on the upstream side of the heating element 11, and the temperature of the gas decreases on the downstream side of the heating element 11. Then, the resistance of the upstream side temperature sensor 12 decreases as the temperature of the upstream side temperature sensor 12 arranged on the upstream side of the heating element 11 increases, and the voltage that is the output signal of the upstream side temperature sensor 12 increases above 0 [mV] as illustrated in FIG. 6. Further, during the backflow of the gas, the resistance of the downstream side temperature sensor 13 increases as the temperature of the downstream side temperature sensor 13 arranged on the downstream side of the heating element 11 decreases, and the voltage that is the output signal of the downstream side temperature sensor 13 decreases below 0 [mV] as illustrated in FIG. 7.

As illustrated in FIG. 6, the increase amount of the voltage of the upstream side temperature sensor 12 during the backflow of the gas is smaller than the decrease amount of the voltage of the upstream side temperature sensor 12 during the forward flow of the gas. On the other hand, as illustrated in FIG. 7, the increase amount of the voltage of the downstream side temperature sensor 13 during the forward flow of the gas is smaller than the decrease amount of the voltage of the downstream side temperature sensor 13 during the backflow of the gas. In this way, the voltage output characteristics of the upstream side temperature sensor 12 and the downstream side temperature sensor 13 are asymmetrical between the forward flow and the backflow.

Further, the upstream side temperature sensor 12 and the downstream side temperature sensor 13 have different voltage output characteristics. That is, the upstream side temperature sensor 12 has a high sensitivity during the forward flow of the gas, but has a low sensitivity during the backflow of the gas as illustrated in FIG. 6. On the other hand, the downstream side temperature sensor 13 has a high sensitivity during the backflow of the gas, but has a low sensitivity during the forward flow of the gas as illustrated in FIG. 7.

Further, as illustrated in FIGS. 8 and 9, the responsiveness of the upstream side temperature sensor 12 and the downstream side temperature sensor 13 changes according to the output voltage illustrated in FIGS. 6 and 7. This is similar to a resonance frequency increasing at the time of flicking the center of a string with high tension, and the responsiveness increases as a change amount of an output voltage increases in the upstream side temperature sensor 12 and the downstream side temperature sensor 13.

That is, the output voltage of the upstream side temperature sensor 12 and the downstream side temperature sensor 13 are different for any flow rate of the gas as illustrated in FIGS. 6 and 7, and thus, each responsiveness of the upstream side temperature sensor 12 and the downstream side temperature sensor 13 with respect to any gas flow rate is also different as illustrated in FIGS. 8 and 9. Such a difference in responsiveness between the upstream side temperature sensor 12 and the downstream side temperature sensor 13 causes a measurement error of the flow rate when the gas pulsates, that is, a pulsation error. Further, the magnitudes of the pulsation error also differ between the upstream side temperature sensor 12 and the downstream side temperature sensor 13.

The output signal of the upstream side temperature sensor 12 and the output signal of the downstream side temperature sensor 13 having the above-described output characteristics and responsiveness and different pulsation errors are individually output from the detection element and individually input to the compensator 20 as illustrated in FIG. 1. More specifically, the output signal of the upstream side temperature sensor 12 is input to the first compensator 20, and the output signal of the downstream side temperature sensor 13 is input to the second compensator 20.

The upstream side temperature sensor 12 has a frequency characteristic as illustrated in FIG. 10, for example. Note that a cutoff frequency changes depending on a gas flow rate, that is, an air flow rate as illustrated in FIG. 8. As described above, the compensator 20 has, for example, the frequency characteristic illustrated in FIG. 5. As a result, the frequency characteristic of the output signal of the upstream side temperature sensor 12 individually output from the detection element 10 and input to the compensator 20 is individually compensated by the compensator 20. Similarly, the frequency characteristic of the output signal of the downstream side temperature sensor 13 individually output from the detection element 10 and input to the compensator 20 is individually compensated by the compensator 20.

The output signal of the upstream side temperature sensor 12 and the output signal of the downstream side temperature sensor 13, which are individually compensated by the compensator 20, are input to the subtractor 30. The subtractor 30 subtracts the compensated output signal of the downstream side temperature sensor 13 from the compensated output signal of the upstream side temperature sensor 12, and outputs a result to the pulsation correction circuit 40. The pulsation correction circuit 40 outputs the flow rate of the gas such as air whose pulsation error has been corrected, based on the subtraction result input from the subtractor 30.

As described above, the thermal flow rate meter 1 of the present embodiment measures the gas flow rate based on the temperature difference between the upstream side temperature sensor 12 and the downstream side temperature sensor 13 which are respectively arranged on the upstream side and the downstream side of the heating element 11. Further, the thermal flow rate meter 1 includes: the detection element 10 that individually outputs the output signal of the upstream side temperature sensor 12 and the output signal of the downstream side temperature sensor 13; and the compensation of the output signal of the upstream side temperature sensor 12 and the output signal of the downstream side temperature sensor 13. With this configuration, it is possible to individually correct the different pulsation errors of the upstream side temperature sensor 12 and the downstream side temperature sensor 13 generated due to the difference in responsiveness between the upstream side temperature sensor 12 and the downstream side temperature sensor 13 as described above. Therefore, the pulsation error of the thermal flow rate meter 1 can be reduced more than the related art, and the measurement accuracy can be improved more than the related art.

Further, the upstream side temperature sensor 12 and the downstream side temperature sensor 13 are temperature sensitive resistors or thermocouples in the thermal flow rate meter 1 of the present embodiment. With this configuration, the flow rate of the gas, such as air, which is heated by the heating element 11 and flows in the forward direction or the backward direction, can be measured based on the temperature changes of the upstream side temperature sensor 12 and the downstream side temperature sensor 13.

Further, in the thermal flow rate meter 1 of the present embodiment, the detection element 10 includes: the first fixed resistor 14 connected in series to the upstream side temperature sensor 12 and connected to the ground potential; and the second fixed resistor 15 connected in series to the downstream side temperature sensor 13 and connected to the ground potential. With this configuration, potentials of the upstream side temperature sensor 12 and the downstream side temperature sensor 13 can be lowered, and it is possible to prevent dust and dirt from being adsorbed to the upstream side temperature sensor 12 and the downstream side temperature sensor 13 due to static electricity. Therefore, the thermal flow rate meter 1 can be used in an environment where there is much dust and dirt.

Further, the shape of the upstream side temperature sensor 12 and the shape of the first fixed resistor 14 are the same in the thermal flow rate meter 1 of the present embodiment. With this configuration, the accuracy of a ratio between the upstream side temperature sensor 12 and the first fixed resistor 14 can be improved. That is, a ratio value between a resistance value of the upstream side temperature sensor 12 and a resistance value of the first fixed resistor 14 can be accurately set to a predetermined value. More specifically, the upstream side temperature sensor 12 and the first fixed resistor 14 are made of the same material, for example, from the viewpoint of reducing manufacturing cost. Therefore, the resistance value of the first fixed resistor 14 changes similarly to the upstream side temperature sensor 12 as the temperature around the thermal flow rate meter 1 changes. Therefore, when the shape of the upstream side temperature sensor 12 and the shape of the first fixed resistor 14 are made the same as described above, it is possible to improve the accuracy of the ratio between the resistance value of the upstream side temperature sensor 12 and the resistance value of the first fixed resistor 14 and to prevent the output voltage from varying due to the change of the ambient temperature. Therefore, it is possible to provide the thermal flow rate meter 1 with suppressed influence of the ambient temperature.

Further, the shape of the downstream side temperature sensor 13 and the shape of the second fixed resistor 15 are the same shape in the thermal flow rate meter 1 of the present embodiment. With this configuration, the accuracy of a ratio between the downstream side temperature sensor 13 and the second fixed resistor 15 can be improved. That is, a ratio value between a resistance value of the downstream side temperature sensor 13 and a resistance value of the second fixed resistor 15 can be accurately set to a predetermined value. More specifically, the downstream side temperature sensor 13 and the resistance value of the second fixed resistor 15 are made of the same material, for example, from the viewpoint of reducing manufacturing cost. Therefore, the resistance value of the second fixed resistor changes similarly to the downstream side temperature sensor 13 as the temperature around the thermal flow rate meter 1 changes. Therefore, when the shape of the downstream side temperature sensor 13 and the shape of the second fixed resistor 15 are made the same as described above, it is possible to improve the accuracy of the ratio between the resistance value of the downstream side temperature sensor 13 and the resistance value of the second fixed resistor 15 and to suppress a variation in output voltage caused by the change of the ambient temperature. Therefore, it is possible to provide the thermal flow rate meter 1 with suppressed influence of the ambient temperature.

Further, the shape of the first fixed resistor 14 and the shape of the second fixed resistor 15 are the same in the thermal flow rate meter 1 of the present embodiment. As a result, the accuracy of a ratio between the resistance value of the first fixed resistor 14 and the resistance value of the second fixed resistor 15 can be improved. More specifically, the upstream side temperature sensor 12, the downstream side temperature sensor 13, the first fixed resistor 14, and the second fixed resistor 15 are made of, for example, the same material from the viewpoint of reducing manufacturing cost. Therefore, the resistance values of the first fixed resistor 14 and the second fixed resistor 15 change similarly to the upstream side temperature sensor 12 and the downstream side temperature sensor 13 as the temperature around the thermal flow rate meter 1 changes. Therefore, when the shape of the first fixed resistor 14 and the shape of the second fixed resistor 15 are made the same as described above, it is possible to improve the accuracy of the ratio between each of these resistance values and each of the resistance values of the upstream side temperature sensor 12 and the downstream side temperature sensor 13. As a result, it is possible to make variations in the output voltages caused by the change in the ambient temperature coincide between the upstream side temperature sensor 12 and the downstream side temperature sensor 13. Therefore, it is possible to provide the thermal flow rate meter 1 with suppressed influence of the ambient temperature.

Further, the first fixed resistor 14 and the second fixed resistor 15 are arranged close to each other in the thermal flow rate meter 1 of the present embodiment. With this configuration, it is possible to make the temperatures of the first fixed resistor 14 and the second fixed resistor 15 approximately coincide. As described above, the upstream side temperature sensor 12, the downstream side temperature sensor 13, the first fixed resistor and the second fixed resistor 15 are made of the same material, for example. Therefore, the resistance values of the first fixed resistor 14 and the second fixed resistor 15 change according to the change in the temperature around the thermal flow rate meter 1. However, the temperature difference between the first fixed resistor 14 and the second fixed resistor 15 can be reduced by arranging the first fixed resistor 14 and the second fixed resistor 15 close to each other as described above. As a result, it is possible to reduce variations in the outputs of the upstream side temperature sensor 12 and the downstream side temperature sensor 13 caused by the temperature difference between the first fixed resistor 14 and the second fixed resistor 15, and the thermal flow rate meter 1 with higher accuracy can be provided.

Further, the thermal flow rate meter 1 of the present embodiment includes the substrate 2 and the diaphragm 3 provided on the substrate 2. Further, the upstream side temperature sensor 12 and the downstream side temperature sensor 13 are provided on the diaphragm 3, and the first fixed resistor 14 and the second fixed resistor 15 are provided on the substrate 2 outside the diaphragm 3. With this configuration, the thermal influence, caused by the heat generated in the heating element 11, on the first fixed resistor 14 and the second fixed resistor 15 can be reduced as compared with the upstream side temperature sensor 12 and the downstream side temperature sensor 13. As a result, the temperature changes of the first fixed resistor 14 and the second fixed resistor 15 caused by the temperature change of the heating element 11 is suppressed, and it is possible to reduce the temperature difference between the first fixed resistor 14 and the second fixed resistor 15. Therefore, the variation in the output voltage of the thermal flow rate meter 1 caused by the temperature difference between the first fixed resistor 14 and the second fixed resistor 15 is suppressed, and the thermal flow rate meter 1 with higher accuracy can be provided.

As described above, it is possible to individually correct the different pulsation errors generated in the upstream side temperature sensor 12 and the downstream side temperature sensor 13, and the thermal flow rate meter 1 with higher accuracy than the related art can be provided according to the present embodiment.

Second Embodiment

Figure 11:
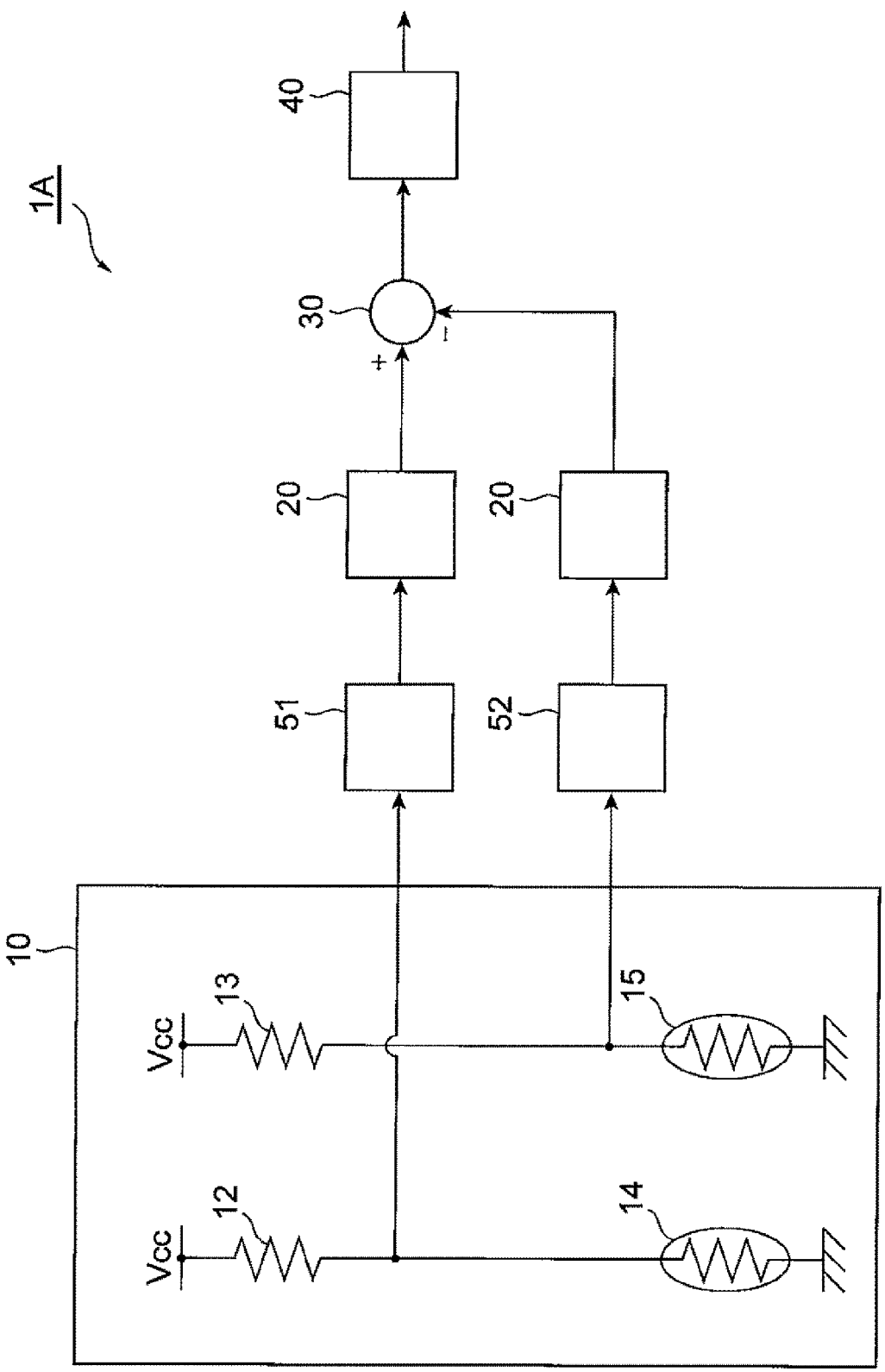
FIG. 11 is a schematic circuit diagram of a thermal flow rate meter according to a second embodiment.

Next, a second embodiment of the thermal flow rate meter according to the present disclosure will be described. FIG. 11 is a schematic circuit diagram of a thermal flow rate meter 1A according to the second embodiment.

The thermal flow rate meter 1A of the present embodiment is different from the thermal flow rate meter 1 of the first embodiment described above in terms of including a first analog/digital converter 51 that performs AD conversion of an output of the upstream side temperature sensor 12 and a second analog/digital converter 52 that performs AD conversion of an output of the downstream side temperature sensor 13. The other points of the thermal flow rate meter 1A of the present embodiment are the same as those of the thermal flow rate meter 1 of the first embodiment described above, and thus, the similar parts will be denoted by the same reference signs, and the description thereof will be omitted.

The first analog/digital converter 51 receives, for example, an output of the upstream side temperature sensor 12 individually taken out from the detection element 10 as an input, and performs AD conversion of the output of the upstream side temperature sensor 12 and output the converted output to the compensator 20. The second analog/digital converter 52 receives, for example, an output of the downstream side temperature sensor 13 individually taken out from the detection element 10 as an input, and performs AD conversion of the output of the downstream side temperature sensor 13 and output the converted output to the compensator 20.

The thermal flow rate meter 1A of the present embodiment includes the first analog/digital converter 51 and the second analog/digital converter 52, and thus, can digitize output signals from the upstream side temperature sensor 12 and the downstream side temperature sensor 13. As a result, more complicated arithmetic processing can be performed as compared with a case where a signal input to the compensator 20 is an analog signal, and it is possible to provide the thermal flow rate meter 1 with a smaller pulsation error. Hereinafter, a signal diagram of the upstream side temperature sensor 12 and the content of the arithmetic processing of the compensator 20 will be described.

Figure 12:
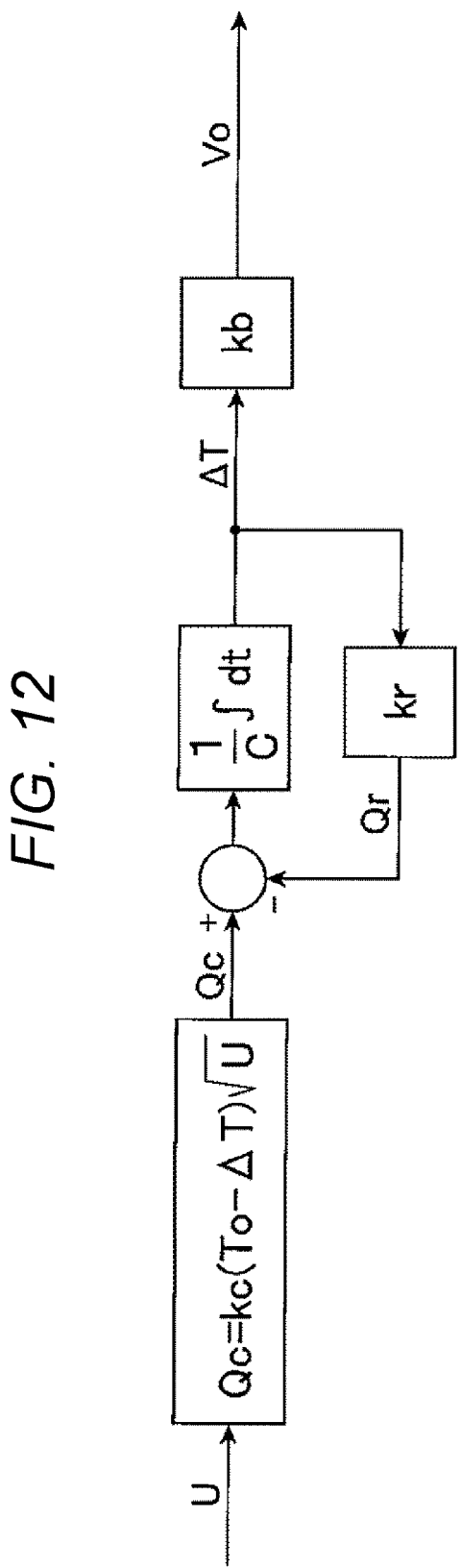
FIG. 12 is a signal diagram of an upstream side temperature sensor of the thermal flow rate meter of FIG. 11.

FIG. 12 is the signal diagram of the upstream side temperature sensor 12. Here, the amount of heat lost by heat transfer from the upstream side temperature sensor 12, that is, a heat radiation amount caused by heat transfer of the upstream side temperature sensor 12 is Qc. Further, a heat input amount transferred from the heating element 11 to the upstream side temperature sensor 12 by heat conduction is Qr. Further, a heat transfer coefficient is kc, an initial temperature of the upstream side temperature sensor 12 is To, a temperature change of the upstream side temperature sensor 12 is $\Delta T$, a heat capacity of the upstream side temperature sensor 12 C, a thermal conductivity is kr, and a bridge sensitivity is kb At this time, the heat radiation amount Qc caused by the heat transfer of the upstream side temperature sensor is represented by the product of the heat transfer coefficient kc, the temperature of the upstream side temperature sensor 12, that is, a difference between the initial temperature To of the upstream side temperature sensor 12 and the temperature change of the upstream side temperature sensor 12, and the square root of an air flow rate U as in the following Formula (1).

[Formula 1]

$$Qc = kc(To - \Delta T)\sqrt{U} \qquad (1)$$

Further, the heat input amount Qr transferred from the heating element 11 to the upstream side temperature sensor 12 by heat conduction is represented by the product of the thermal conductivity kr and the temperature change $\Delta T$ of the upstream side temperature sensor 12. Further, the temperature change $\Delta T$ of the upstream side temperature sensor 12 can be obtained by integrating a difference between the heat radiation amount Qc and the heat input amount Qr with the heat capacity C of the upstream side temperature sensor 12 as a coefficient.

As a result, the temperature change $\Delta T$ of the upstream side temperature sensor 12 is output as a sensor output Vo via the sensitivity kb of the bridge circuit configured using the upstream side temperature sensor 12 and the first fixed resistor 14. That is, with the operation as a system such that the heat radiation amount Qc from the upstream side temperature sensor 12 and the heat input amount Qr from the heating element 11 to the upstream side temperature sensor 12 are balanced, the temperature change $\Delta T$ of the upstream side temperature sensor 12 is determined, and the sensor output Vo is determined.

Figure 13:
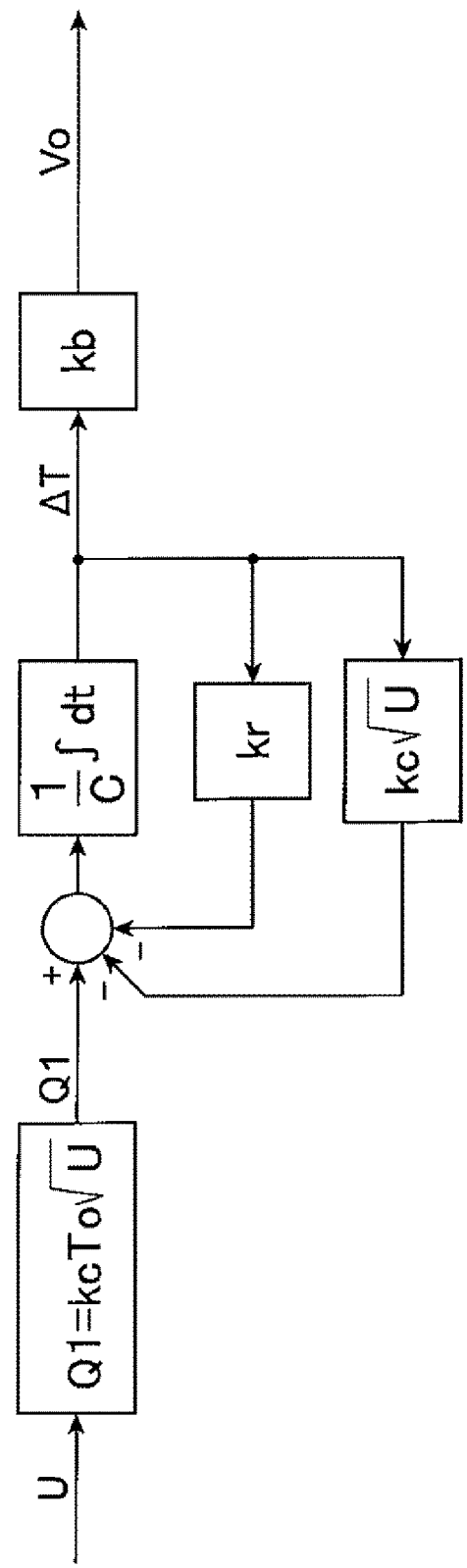
FIG. 13 is a signal diagram obtained by rewriting the signal diagram of the upstream side temperature sensor of FIG. 12.

FIG. 13 is a signal diagram obtained by rewriting the signal diagram of FIG. 12. In FIG. 13, the thermal conductivity kr, the product of the heat transfer coefficient kc and the square root of the air flow rate U are arranged in a feedback section of an integrator. A response speed of such a system is determined by a coefficient of the integrator and a coefficient of the feedback section. That is, the response speed of the upstream side temperature sensor 12 depends on the square root of the air flow rate U.

Figure 14:
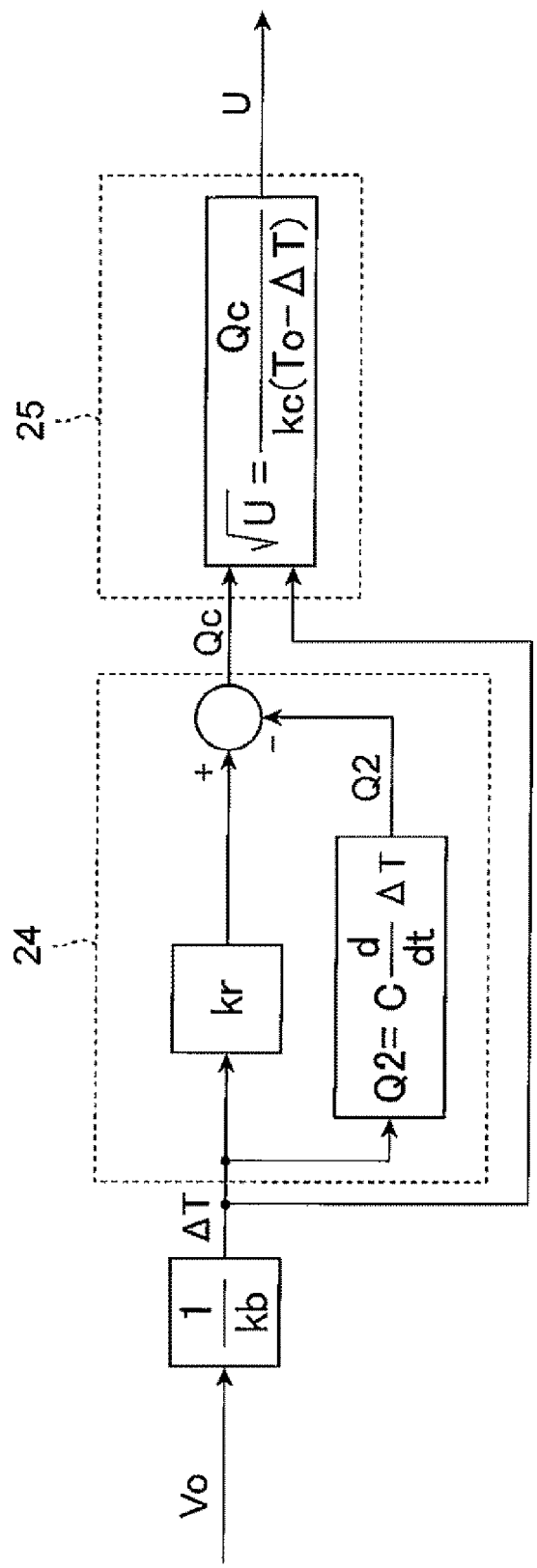
FIG. 14 is a signal diagram of an inverse function of the signal diagram of the upstream side temperature sensor of FIG. 12.

FIG. 14 is a signal diagram of an inverse function of the signal diagram of FIG. 12. That is, the signal diagram illustrated in FIG. 14 can be obtained by obtaining the inverse function of the signal diagram illustrated in FIG. 12. That is, the arithmetic processing illustrated in the signal diagram of FIG. 14 is performed in the compensator 20, which is the response compensation circuit, to perform response compensation of the upstream side temperature sensor 12, and a saturation characteristic of the output of the upstream side temperature sensor 12 can be linearized.

A pulsation error of the thermal flow rate meter 1A is also caused by a response delay of the upstream side temperature sensor 12, but the pulsation error of the thermal flow rate meter 1 is also affected by the saturation characteristic of the upstream side temperature sensor 12. That is, it is also possible to correct the pulsation error caused by the response delay of the upstream side temperature sensor 12 and the saturation characteristic of the output of the upstream side temperature sensor 12 by performing the arithmetic processing illustrated in the signal diagram of FIG. 14 by the compensator 20. Therefore, it is possible to provide the thermal flow rate meter 1 with the reduced pulsation error. Note that the downstream side temperature sensor 13 can also be subjected to the same processing as that of the upstream side temperature sensor 12 in the compensator 20 to further reduce the pulsation error of the thermal flow rate meter 1A.

In the thermal flow rate meter 1A of the present embodiment, the compensator includes a response compensator 24 and a linearizer 25. The linearizer 25 individually linearizes the output of the upstream side temperature sensor 12 and the output of the downstream side temperature sensor 13. A cutoff frequency in a frequency characteristic of the response compensator 24 is determined by the thermal conductivity kr and the heat capacity C That is, the response compensator 24 can be realized by a response compensation circuit having a fixed frequency characteristic. Further, the linearizer 25 is also a static function that receives each input of the heat radiation amount Qc of the upstream side temperature sensor and the temperature change ΔT, and thus, can be configured using a two-dimensional map.

Therefore, the compensator 20 can be realized by the response compensator 24 having the fixed frequency characteristic and the linearizer 25 configured using the static function in the thermal flow rate meter 1A of the present embodiment. With such relatively simple arithmetic processing, the thermal flow rate meter 1A of the present embodiment can also correct the pulsation error caused by the response delays and the saturation characteristics of the upstream side temperature sensor 12 and the downstream side temperature sensor 13.

Third Embodiment

Figure 15:
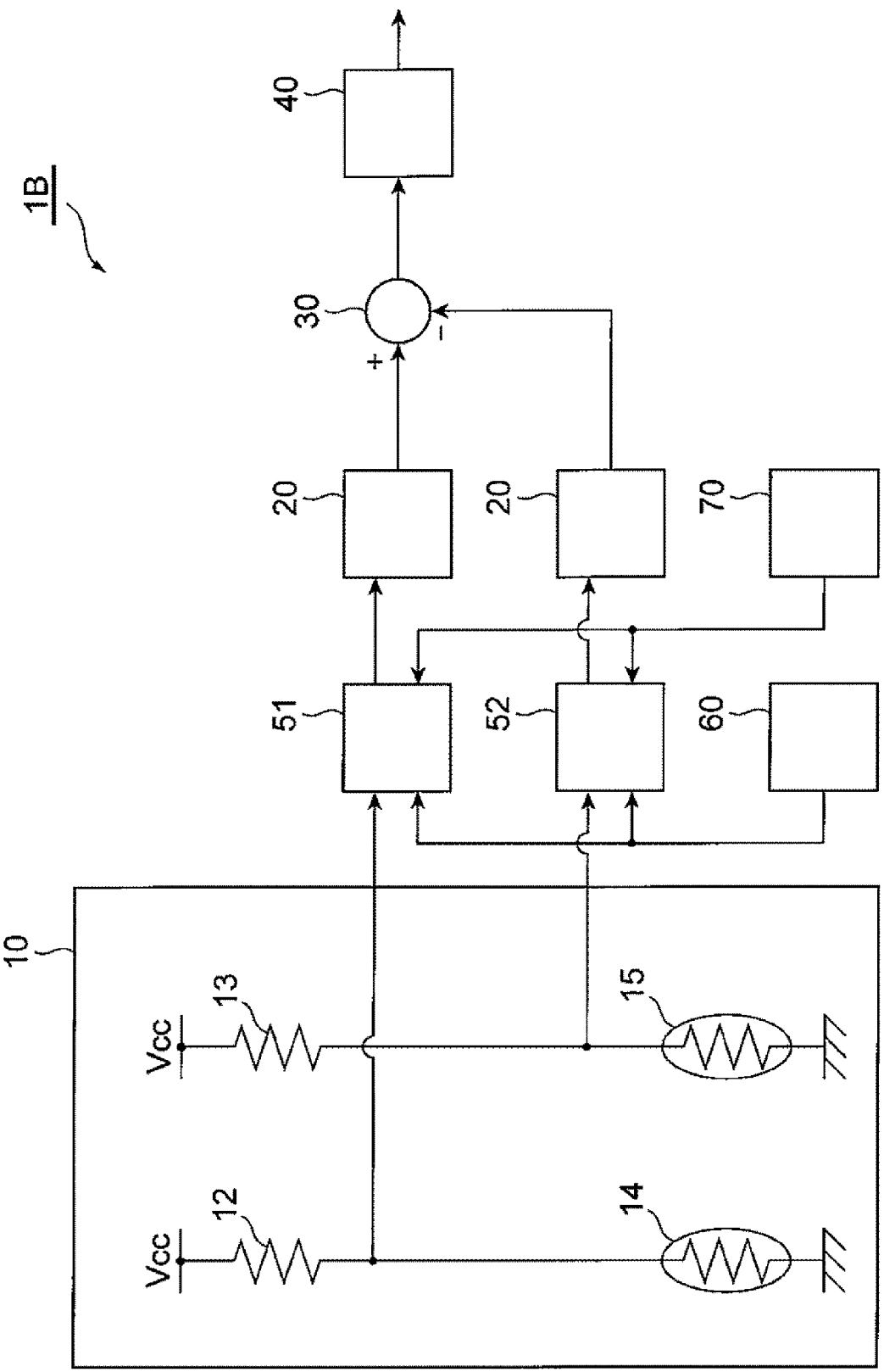
FIG. 15 is a schematic circuit diagram of a thermal flow rate meter according to a third embodiment.

Next, a third embodiment of the thermal flow rate meter according to the present disclosure will be described. FIG. 15 is a schematic circuit diagram of a thermal flow rate meter 1B according to the third embodiment. The thermal flow rate meter 1B of the present embodiment is different from the thermal flow rate meter 1A of the second embodiment in terms that a reference voltage circuit 60 that determines a reference voltage is provided and the first analog/digital converter 51 and the second analog/digital converter 52 are connected to the same reference voltage circuit 60.

Further, the thermal flow rate meter 1B of the present embodiment is different from the thermal flow rate meter 1A of the second embodiment described above in terms that a clock generator 70 that outputs a clock signal is provided and the first analog/digital converter 51 and the second analog/digital converter 52 are connected to the same clock generator 70 and operate with the same clock signal. The other points of the thermal flow rate meter 1B of the present embodiment are the same as those of the thermal flow rate meter 1A of the second embodiment described above, and thus, the similar parts will be denoted by the same reference signs, and the description thereof will be omitted.

Figure 16:
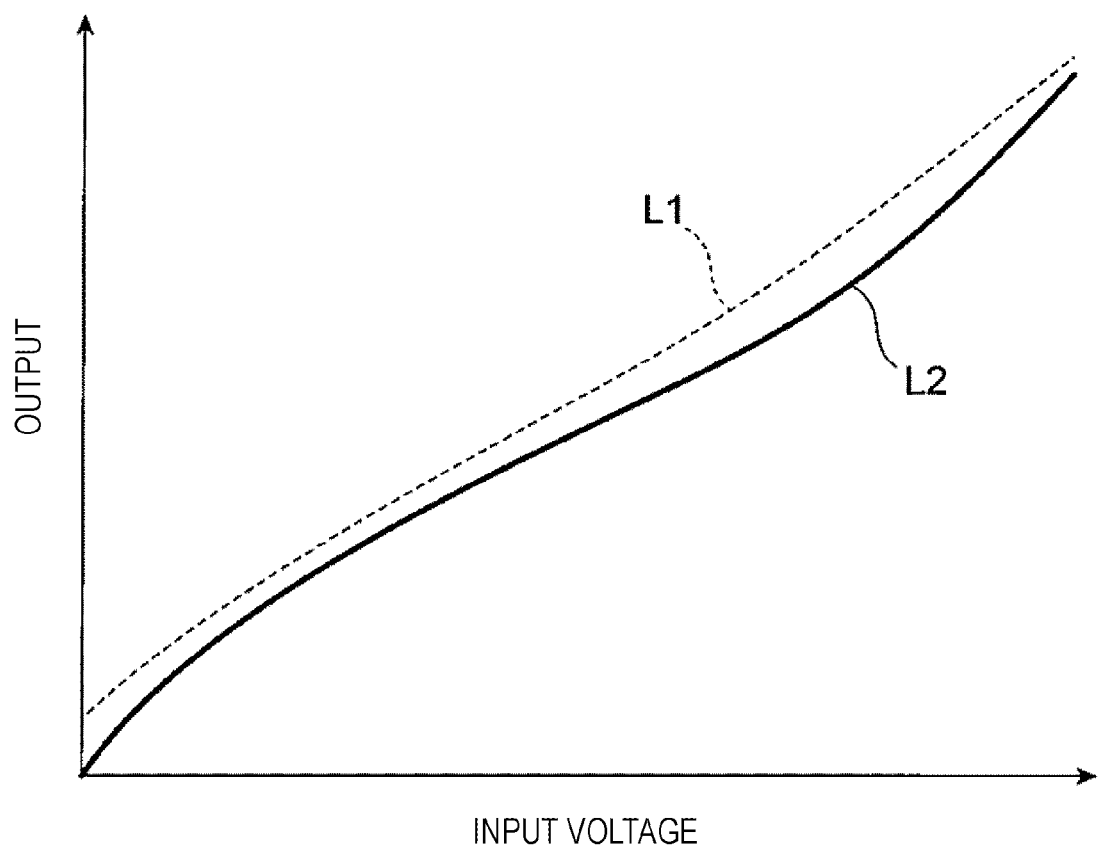
FIG. 16 is a graph illustrating input/output characteristics of an AD converter of the thermal flow rate meter illustrated in FIG. 15.

FIG. 16 is a graph illustrating an example of input/output characteristics of the first analog/digital converter 51 and the second analog/digital converter 52. In FIG. 16, the input/output characteristic of the first analog/digital converter 51 is illustrated by a broken line L1, and the input/output characteristic of the second analog/digital converter 52 is illustrated by a solid line L2. As illustrated in FIG. 16, the input/output characteristic of the first analog/digital converter 51 and the input/output characteristic of the second analog/digital converter 52 are not the same but slightly different. It is necessary to reduce difference between the input/output characteristic of the first analog/digital converter 51 and the input/output characteristic of the second analog/digital converter 52 as much as possible from the viewpoint of improving the accuracy of the thermal flow rate meter 1B.

As described above, the thermal flow rate meter 1B of the present embodiment includes: the reference voltage circuit 60 that determines the reference voltage, and the first analog/digital converter 51 and the second analog/digital converter 52 are connected to the same reference voltage circuit 60. With this configuration, it is possible to reduce the difference between the input/output characteristics of the first analog/digital converter 51 and the second analog/digital converter 52, and to improve the measurement accuracy of the thermal flow rate meter 1B.

Further, as described above, the thermal flow rate meter 1B of the present embodiment includes the clock generator 70 that outputs the clock signal, and the first analog/digital converter 51 and the second analog/digital converter 52 are connected to the same clock generator 70 and operate with the same clock signal. With this configuration, it is possible to reduce the difference between the input/output characteristics of the first analog/digital converter 51 and the second analog/digital converter 52, and to improve the measurement accuracy of the thermal flow rate meter 1B.

Furthermore, in the thermal flow rate meter 1B of the present embodiment, it is possible to reduce the difference between the input/output characteristics of the first analog/digital converter 51 and the second analog/digital converter 52, for example, when the first analog/digital converter 51 and the second analog/digital converter 52 have the same circuit configuration. Therefore, the measurement accuracy of the thermal flow rate meter 1B can be improved. Note that the same circuit configuration means, for example, having the same circuit arrangement including the same circuit element and the same wiring pattern.

Fourth Embodiment

Figure 17:
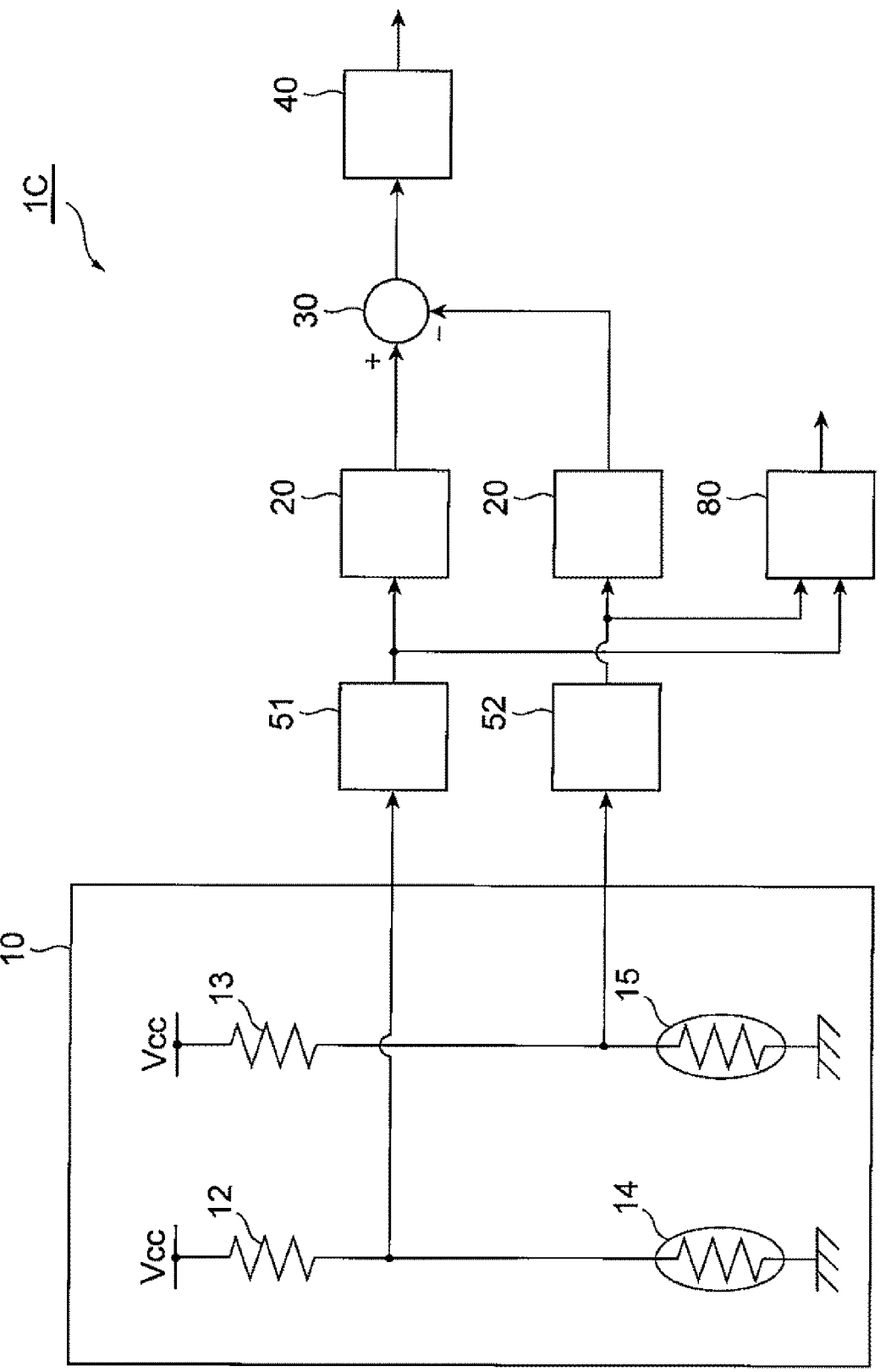
FIG. 17 is a schematic circuit diagram of a thermal flow rate meter according to a fourth embodiment.

Next, a fourth embodiment of the thermal flow rate meter according to the present disclosure will be described. FIG. 17 is a schematic circuit diagram of a thermal flow rate meter 1C according to the fourth embodiment. The thermal flow rate meter 1C of the present embodiment is different from the thermal flow rate meter 1A of the second embodiment described above in terms of having a failure determination unit 80 that determines a failure based on an output of the upstream side temperature sensor 12 and an output of the downstream side temperature sensor 13. The other points of the thermal flow rate meter 1C of the present embodiment are the same as those of the thermal flow rate meter 1A of the second embodiment described above, and thus, the similar parts will be denoted by the same reference signs, and the description thereof will be omitted.

Figure 22:
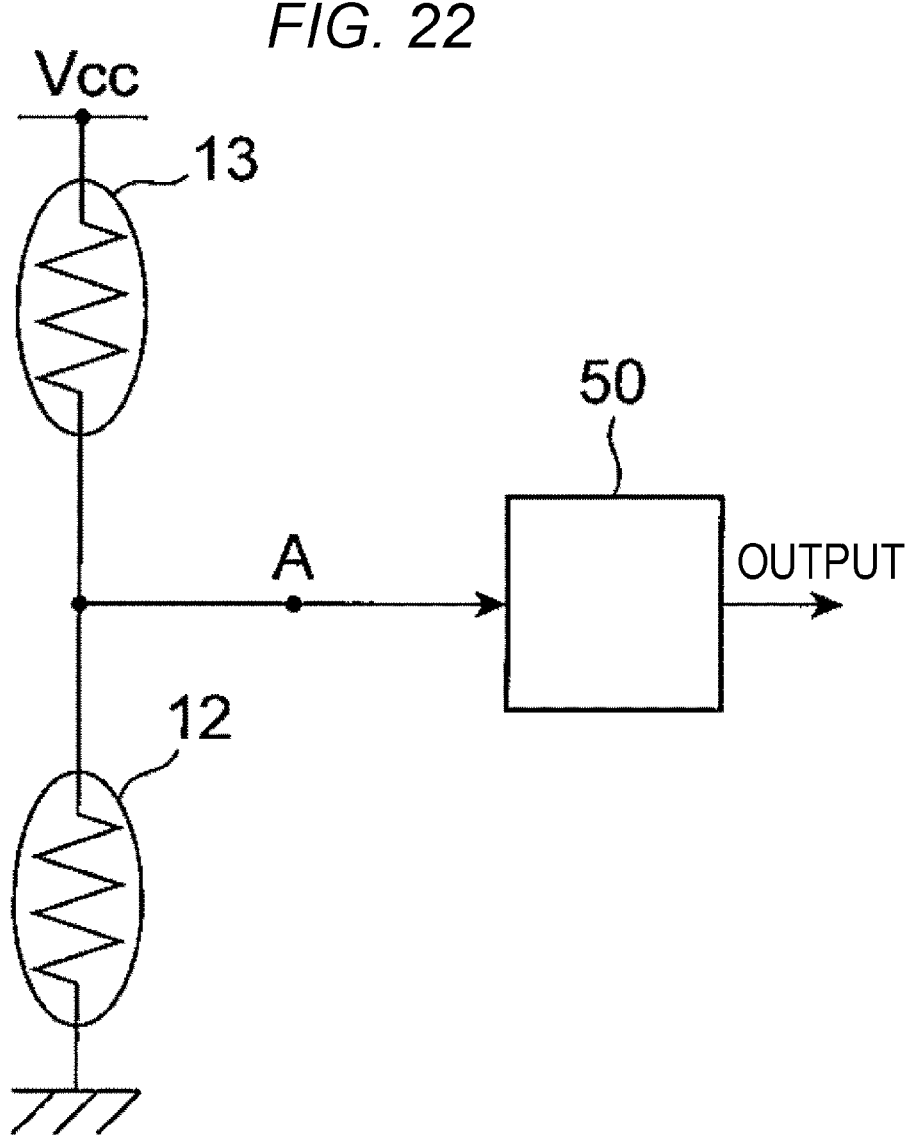
FIG. 22 is a circuit diagram illustrating a part of a configuration of detection element of a conventional thermal flow rate meter.
Figure 23:
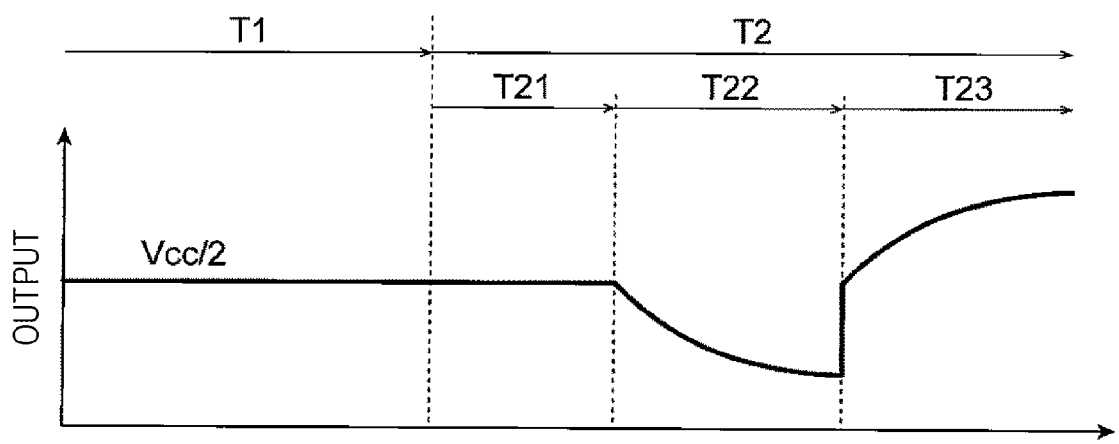
FIG. 23 is a graph illustrating an output of a part of a detection element illustrated in FIG. 22.

Hereinafter, the thermal flow rate meter 1C of the present embodiment will be described on the basis of comparison with a conventional thermal flow rate meter. FIG. 22 is a circuit diagram illustrating a part of a configuration of a detection element of the conventional thermal flow rate meter. FIG. 23 is a graph illustrating an output of the part of the detection element of FIG. 22. Note that, in the conventional thermal flow rate meter, the same configurations as those of the thermal flow rate meter 1C of the present embodiment will be denoted by the same reference signs, and the description thereof will be omitted.

As illustrated in FIG. 22, in the detection element of the conventional thermal flow rate meter, an upstream side temperature sensor 12 and a downstream side temperature sensor 13 are connected in series, the downstream side temperature sensor 13 is connected to a power supply voltage Vcc, and the upstream side temperature sensor 12 is connected to a ground potential. Further, the detection element of this conventional thermal flow rate meter is configured such that a voltage at a connection point between the upstream side temperature sensor 12 and the downstream side temperature sensor 13 is detected by an AD converter 50.

In this case, an output of the AD converter 50 during a period T1 in which a heating element 11 is in a non-heating state becomes the power supply voltage Vcc/2 as illustrated in FIG. 23. Further, both temperatures of the upstream side temperature sensor 12 and the downstream side temperature sensor 13 rise during a period T21 in a state where an air flow rate is zero in a period T2 in which the heating element 11 is in a heating state. Therefore, the output of the AD converter 50 becomes the power supply voltage Vcc/2. Further, during a period T22 in which a gas such as air flows in the forward direction and the flow rate increases, the temperature of the upstream side temperature sensor 12 decreases and the temperature of the downstream side temperature sensor 13 increases, so that the output of the AD converter 50 decreases.

Further, during a period T23 in which the gas such as air flows in the backward direction and the flow rate increases, the temperature of the upstream side temperature sensor 12 increases, and the temperature of the downstream side temperature sensor 13 decreases. Therefore, the output of the AD converter 50 increases. Further, when the circuit is disconnected at a point A in FIG. 22, the output of the AD converter 50 becomes the power supply voltage Vcc/2. In this case, it is difficult to distinguish between the period T21 in which the air flow rate is zero and the circuit disconnection, and it is difficult to detect the disconnection at the point A only by the output of the AD converter 50.

Figure 18:
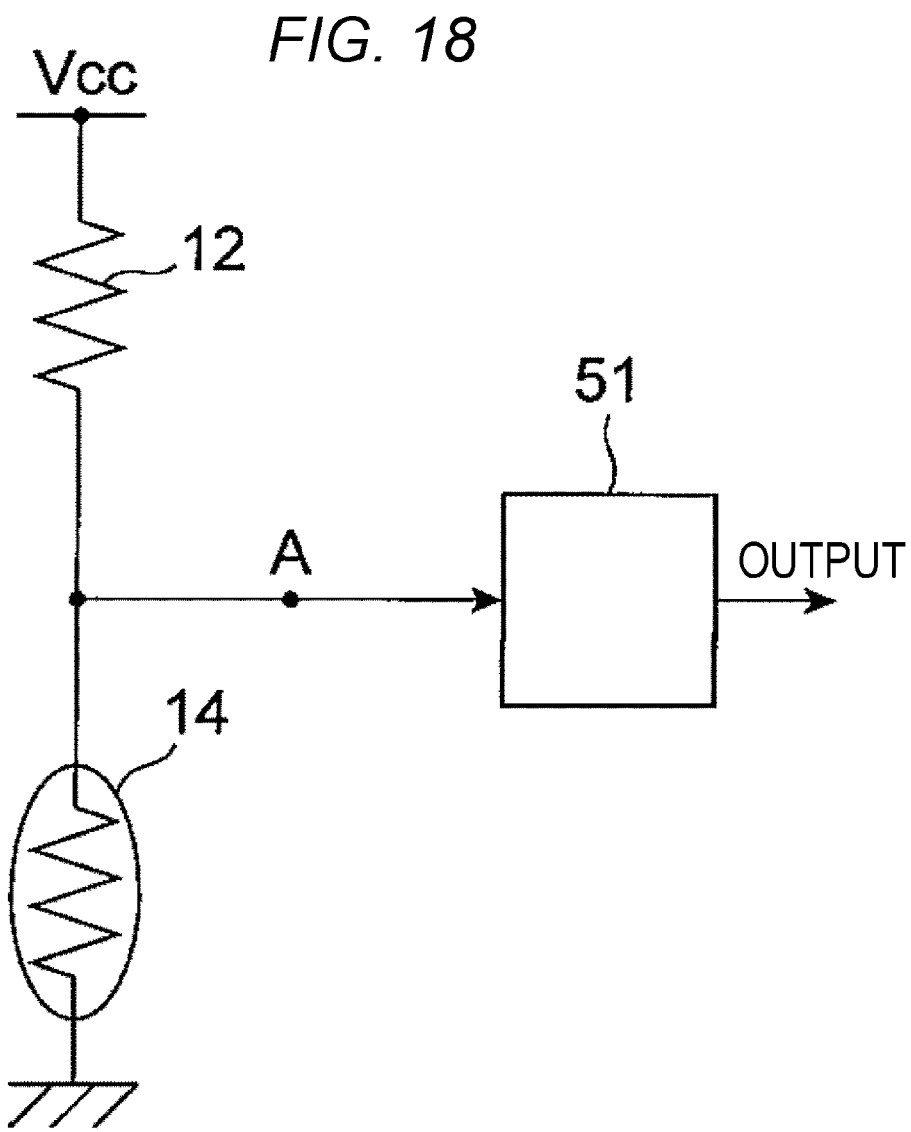
FIG. 18 is a circuit diagram illustrating a part of a configuration of a detection element of the thermal flow rate meter of FIG. 17.
Figure 19:
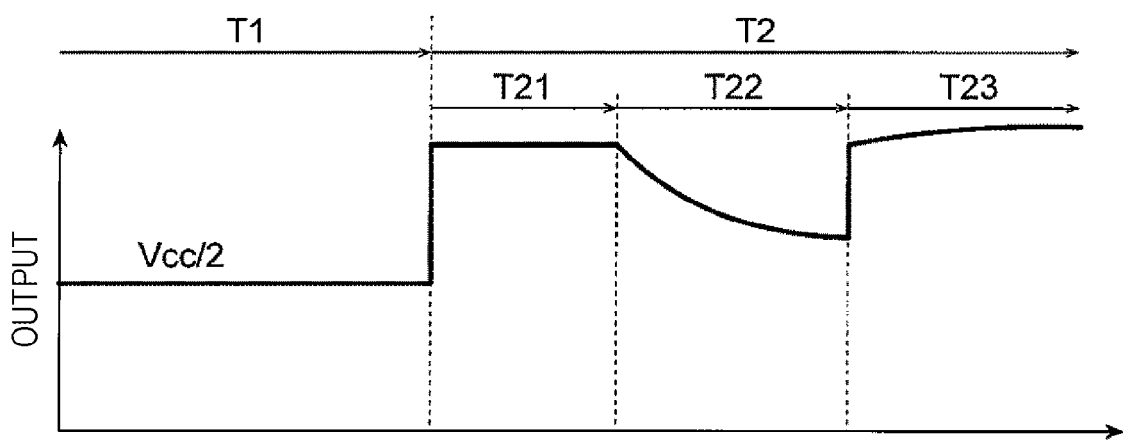
FIG. 19 is a graph illustrating an output of a part of the detection element of FIG. 18.

FIG. 18 is a circuit diagram illustrating a part of a configuration of the detection element 10 of the thermal flow rate meter 1C of FIG. 17. FIG. 19 is a graph illustrating an output of the part of the detection element 10 of FIG. 18. In contrast to the conventional thermal flow rate meter illustrated in FIG. 22, the upstream side temperature sensor 12 and the first fixed resistor 14 are connected in series, the upstream side temperature sensor 12 is connected to the power supply voltage Vcc, and the first fixed resistor 14 is connected to the ground potential in the thermal flow rate meter 1C of the present embodiment illustrated in FIG. 18. Further, a voltage at a connection point between the upstream side temperature sensor 12 and the first fixed resistor 14 is detected by the first analog/digital converter 51.

In this case, an output of the first analog/digital converter 51 becomes the power supply voltage Vcc/2 during a period T1 in which the heating element 11 is not heated as illustrated in FIG. 19. Further, the temperature of the upstream side temperature sensor 12 increases during a period T21 in which the air flow rate is zero in a period T2 in which the heating element 11 is in the heating state. As a result, the output of the first analog/digital converter 51 increases as the temperature of the upstream side temperature sensor 12 increases.

Further, the temperature of the upstream side temperature sensor 12 decreases during a period T22 in which the air flows in the forward direction and the flow rate increases. Therefore, the output of the first analog/digital converter 51 becomes lower than the output voltage during the period T21 in which the air flow rate is zero. Further, the temperature of the upstream side temperature sensor 12 increases during a period T23 in which the air flows in the backward direction and the flow rate increases. Therefore, the output of the upstream side temperature sensor 12 is higher than the output voltage during the period T21 in which the air flow rate is zero.

Further, when the circuit illustrated in FIG. is disconnected at a point A, the output of the first analog/digital converter 51 becomes the power supply voltage Vcc/2. In this case, the output voltage of the first analog/digital converter 51 when the point A is disconnected and the output voltage of the first analog/digital converter 51 during the period T21 in which the air flow rate is zero are clearly distinguished. That is, the output of the first analog/digital converter 51 is observed by the failure determination unit 80 to detect whether or not the output falls within a predetermined output range, so that it is possible to detect the disconnection at the point A of the circuit.

The above description of the upstream side temperature sensor 12 similarly applies to the downstream side temperature sensor 13 as well. Therefore, it is possible to detect the disconnection of the circuit of the thermal flow rate meter 1C and to diagnose the disconnection of the circuit of the thermal flow rate meter 1C by determining whether each output voltage of the first analog/digital converter 51 and the second analog/digital converter 52 falls within the predetermined range using the failure determination unit 80. Therefore, it is possible to provide the highly reliable thermal flow rate meter 1C according to the present embodiment.

Fifth Embodiment

Figure 20:
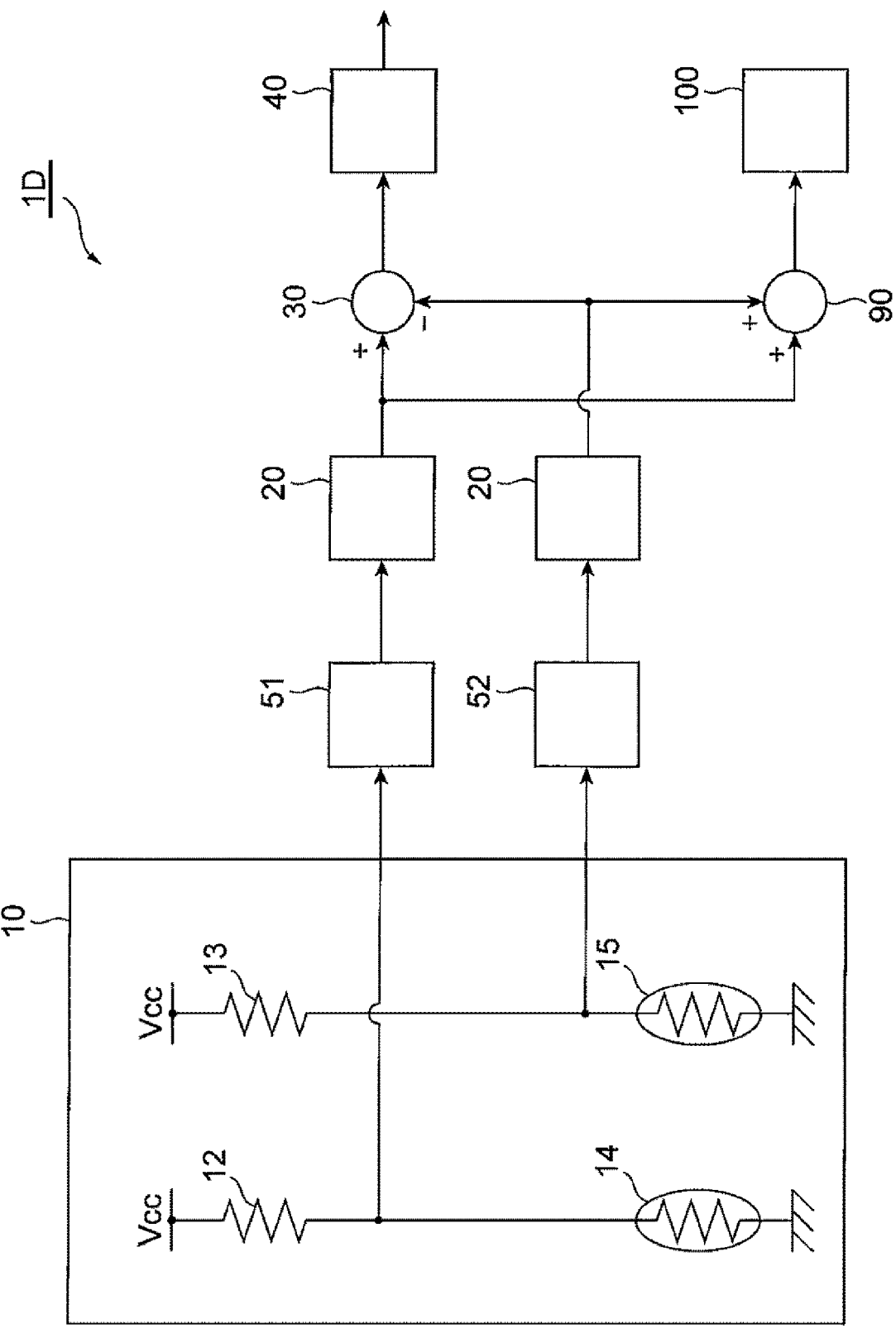
FIG. 20 is a schematic circuit diagram of a thermal flow rate meter according to a fifth embodiment.

Next, a fifth embodiment of the thermal flow rate meter according to the present disclosure will be described. FIG. 20 is a schematic circuit diagram of a thermal flow rate meter 1D according to the fifth embodiment. The thermal flow rate meter 1D of the present embodiment is different from the thermal flow rate meter 1A of the second embodiment described above in terms of including an adder that adds an output sicmal of the upstream side temperature sensor 12 and an output signal of the downstream side temperature sensor 13 which have been individually response-compensated by the compensator 20. Further, the thermal flow rate meter 1D of the present embodiment is different from the thermal flow rate meter 1A of the second embodiment described above in terms of including a temperature control circuit 100 that controls a temperature of the heating element 11 based on an output signal of the adder 90. The other points of the thermal flow rate meter 1D of the present embodiment are the same as those of the thermal flow rate meter 1A of the second embodiment described above, and thus, the similar parts will be denoted by the same reference signs, and the description thereof will be omitted.

An average of the outputs of the upstream side temperature sensor 12 and the downstream side temperature sensor 13 is proportional to the temperature of the heating element 11. Therefore, in the present embodiment, the adder 90 adds the output of the upstream side temperature sensor 12 and the output of the downstream side temperature sensor 13 which have been response-compensated by the compensator 20 to obtain the average of the outputs of the upstream side temperature sensor 12 and the downstream side temperature sensor 13. Then, the temperature control circuit 100 controls the temperature of the heating element 11 based on an output of the adder 90. As a result, a special circuit to detect the temperature of the heating element 11 becomes unnecessary, and it is possible to reduce the cost of the thermal flow rate meter 1D.

Further, the heating element 11 is located to be separate from the upstream side temperature sensor 12 and the downstream side temperature sensor 13. Therefore, when the temperature of the heating element 11 is obtained from the average value of the outputs of the upstream side temperature sensor 12 and the downstream side temperature sensor 13, a response delay occurs, which makes it difficult to control the temperature of the heating element 11 at high speed. However, the compensator 20 is arranged in the present embodiment, and thus, the temperature of the heating element 11 can be detected at high speed from the average value of the outputs of the upstream side temperature sensor 12 and the downstream side temperature sensor 13. As a result, the temperature of the heating element 11 can be controlled at high speed by the temperature control circuit 100, and thus, it is possible to provide the thermal flow rate meter 1D with a high-speed response.

Sixth Embodiment

Figure 21:
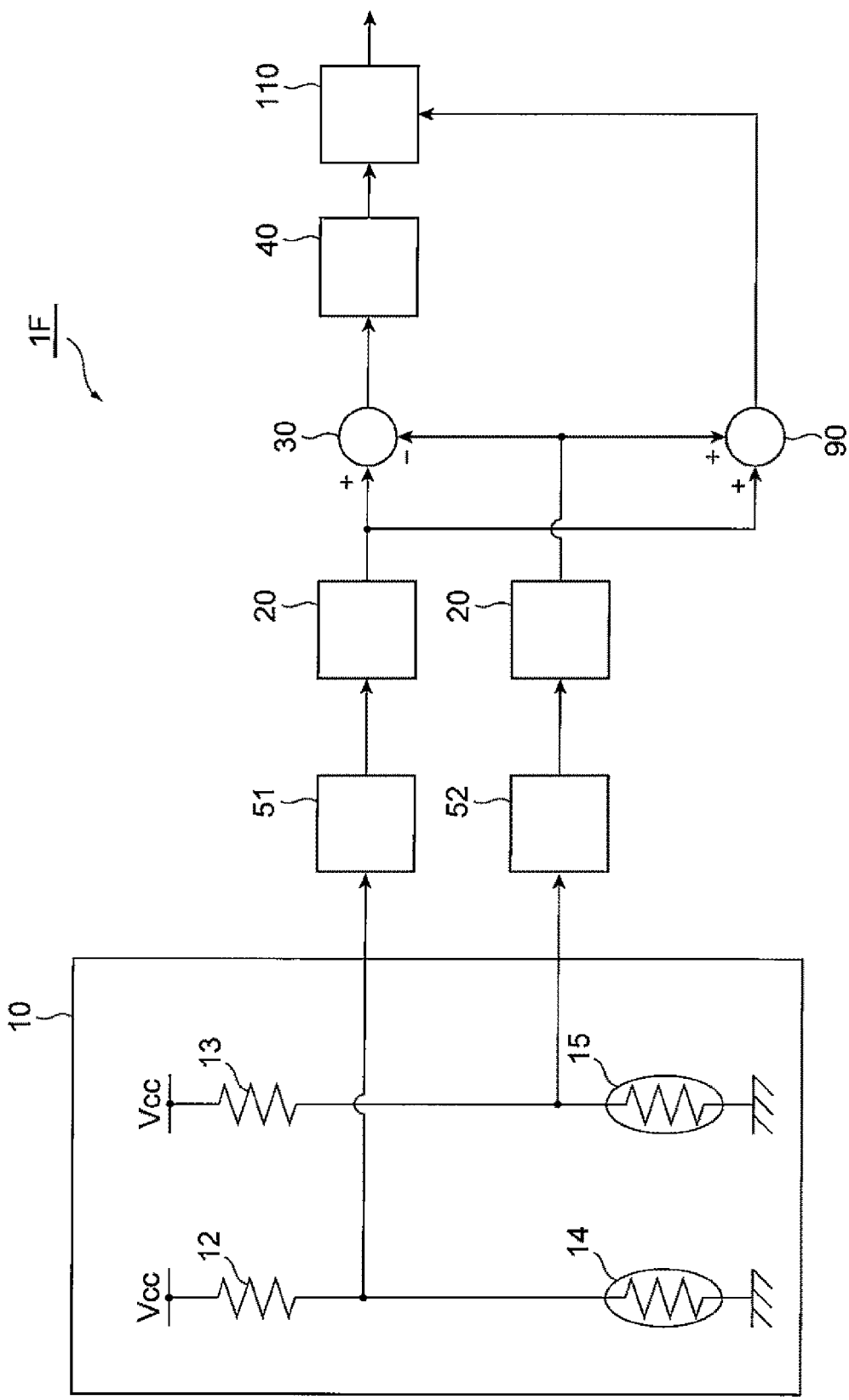
FIG. 21 is a schematic circuit diagram of a thermal flow rate meter according to a sixth embodiment.

Finally, a sixth embodiment of the thermal flow rate meter according to the present disclosure will be described. FIG. 21 is a schematic circuit diagram of a thermal flow rate meter 1F according to the sixth embodiment. The thermal flow rate meter 1F of the present embodiment is different from the thermal flow rate meter 1A of the second embodiment described above in terms of including the adder and a multiplier 110 that performs sensitivity correction based on an output signal of the adder 90. The other points of the thermal flow rate meter 1F of the present embodiment are the same as those of the thermal flow rate meter 1A of the second embodiment described above, and thus, the similar parts will be denoted by the same reference signs, and the description thereof will be omitted.

An average of the outputs of the upstream side temperature sensor 12 and the downstream side temperature sensor 13 is proportional to the temperature of the heating element 11. Therefore, in the present embodiment, the adder 90 adds the output of the upstream side temperature sensor 12 and the output of the downstream side temperature sensor 13 which have been response-compensated by the compensator 20 to obtain the average of the outputs of the upstream side temperature sensor 12 and the downstream side temperature sensor 13. Further, the output of the upstream side temperature sensor 12 and the output of the downstream side temperature sensor 13 are proportional to the temperature of the heating element 11. Therefore, a variation in the temperature of the heating element 11 can be corrected by detecting the temperature of the heating element 11 using the adder 90 and performing the sensitivity correction using the multiplier 110, so that the thermal flow rate meter 1F with higher accuracy can be provided.

Although the embodiments of the present invention have been described in detail with reference to the drawings as above, a specific configuration is not limited to the embodiments, and design alterations or the like made in a scope not departing from a gist of the present invention is included in the present invention.

REFERENCE SIGNS LIST 1 thermal flow rate meter
1A thermal flow rate meter
1B thermal flow rate meter
1C thermal flow rate meter
1D thermal flow rate meter
1F thermal flow rate meter
2 substrate
3 diaphragm
10 detection element
11 heating element
12 upstream side temperature sensor
13 downstream side temperature sensor
14 first fixed resistor
15 second fixed resistor
16 electrode pad
20 compensator
21 multiplier
22 differentiator circuit
23 adder
24 response compensator
25 linearizer
30 subtractor
40 pulsation correction circuit
50 AD converter
51 first analog/digital converter
52 second analog/digital converter
60 reference voltage circuit
70 clock generator
80 failure determination unit
90 adder
100 temperature control circuit
110 multiplier
Vcc power supply voltage

The invention claimed is:

1. A thermal flow rate meter which measures a flow rate of a gas based on a temperature difference between an upstream side temperature sensor and a downstream side temperature sensor respectively arranged on an upstream side and a downstream side of a heating element, the thermal flow rate meter comprising:
   a detector that individually outputs an output signal of the upstream side temperature sensor and an output signal of the downstream side temperature sensor; and
   a compensator that individually performs response compensation of the output signal of the upstream side temperature sensor and the output signal of the downstream side temperature sensor, wherein
   a cutoff frequency of the compensator changes depending on a value of the output signal from the upstream side temperature sensor or a value of the output signal from the downstream side temperature sensor.

2. The thermal flow rate meter according to claim 1, wherein
   the upstream side temperature sensor and the downstream side temperature sensor are temperature sensitive resistors or thermocouples.

3. The thermal flow rate meter according to claim 1, wherein
   the detector includes: a first fixed resistor connected in series to the upstream side temperature sensor and connected to a ground potential; and a second fixed resistor connected in series to the downstream side temperature sensor and connected to the ground potential.

4. The thermal flow rate meter according to claim 3, wherein
a shape of the upstream side temperature sensor and a shape of the first fixed resistor are similar.

5. The thermal flow rate meter according to claim 3, wherein
a shape of the downstream side temperature sensor and a shape of the second fixed resistor are similar.

6. The thermal flow rate meter according to claim 3, further comprising:
a substrate; and
a diaphragm provided on the substrate,
wherein the upstream side temperature sensor and the downstream side temperature sensor are provided on the diaphragm, and
the first fixed resistor and the second fixed resistor are provided on the substrate outside the diaphragm.

7. The thermal flow rate meter according to claim 3, wherein the first fixed resistor and the second fixed resistor are arranged close to each other.

8. The thermal flow rate meter according to claim 3, wherein
a shape of the first fixed resistor and a shape of the second fixed resistor are similar.

9. The thermal flow rate meter according to claim 1, further comprising
a linearizer that individually linearizes an output of the upstream side temperature sensor and an output of the downstream side temperature sensor.

10. The thermal flow rate meter according to claim 1, further comprising:
a first analog/digital converter that performs A/D conversion of an output of the upstream side temperature sensor; and a second analog/digital converter that performs A/D conversion of an output of the downstream side temperature sensor.

11. The thermal flow rate meter according to claim 10, further comprising
a reference voltage circuit that determines a reference voltage,
wherein the first analog/digital converter and the second analog/digital converter are connected to the same reference voltage circuit.

12. The thermal flow rate meter according to claim 10, wherein
the first analog/digital converter and the second analog/digital converter have a similar circuit configuration.

13. The thermal flow rate meter according to claim 10, further comprising
a clock generator that outputs a clock signal,
wherein the first analog/digital converter and the second analog/digital converter are connected to the same clock generator to operate by the same clock signal.

14. The thermal flow rate meter according to claim 1, further comprising
an adder that adds the output signal of the upstream side temperature sensor and the output signal of the downstream side temperature sensor which have been individually response-compensated by the compensator.

15. The thermal flow rate meter according to claim 14, further comprising
a temperature control circuit that controls a temperature of the heating element based on an output signal of the adder.

16. The thermal flow rate meter according to claim 14, further comprising
a multiplier that performs sensitivity correction based on an output signal of the adder.

17. The thermal flow rate meter according to claim 1, wherein the cutoff frequency is determined by a thermal conductivity value and a heat capacity value of either the upstream side temperature sensor or the downstream side temperature sensor.

18. The thermal flow rate meter according to claim 1, wherein
a sensitivity value of the upstream side temperature sensor during forward flow of the gas is greater than the sensitivity value of the upstream side temperature sensor during backflow of the gas, and
a sensitivity value of the downstream side temperature sensor during backflow of the gas is greater than the sensitivity value of the upstream side temperature sensor during forward flow of the gas.

19. A thermal flow rate meter which measures a flow rate of a gas based on a temperature difference between an upstream side temperature sensor and a downstream side temperature sensor respectively arranged on an upstream side and a downstream side of a heating element, the thermal flow rate meter comprising:
a detector that individually outputs an output signal of the upstream side temperature sensor and an output signal of the downstream side temperature sensor;
a compensator that individually performs response compensation of the output signal of the upstream side temperature sensor and the output signal of the downstream side temperature sensor; and
a linearizer that individually linearizes an output of the upstream side temperature sensor and an output of the downstream side temperature sensor.

20. A thermal flow rate meter comprising an upstream side temperature sensor arranged on an upstream side of a heating element, the upstream side temperature sensor comprising:
a detector that detects a flow rate of air flowing across the upstream side temperature sensor;
a first multiplier that outputs an adjusted initial sensor temperature of the upstream side temperature sensor by multiplying a square root of the flow rate, an initial temperature of the upstream side temperature sensor, and a heat transfer coefficient;
a subtractor that outputs a heat loss difference by subtracting (1) a product of a first temperature change of the upstream side temperature sensor and a thermal conductivity of the upstream side temperature sensor, and (2) a product of the first temperature change of the upstream side temperature sensor, the heat transfer coefficient, and the square root of the flow rate, from the adjusted initial sensor temperature;
an integrator that outputs a second temperature change of the upstream side temperature sensor by integrating the heat loss difference with a heat capacity of the upstream side temperature sensor as a coefficient; and
a second multiplier that outputs an output voltage of the upstream side temperature sensor by multiplying the second temperature change and a sensitivity of a bridge circuit of the thermal flow rate meter.

* * * * *